United States Patent
Karras et al.

(10) Patent No.: US 11,250,329 B2
(45) Date of Patent: Feb. 15, 2022

(54) PROGRESSIVE MODIFICATION OF GENERATIVE ADVERSARIAL NEURAL NETWORKS

(71) Applicant: NVIDIA Corporation, Santa Clara, CA (US)

(72) Inventors: Tero Tapani Karras, Helsinki (FI); Timo Oskari Aila, Tuusula (FI); Samuli Matias Laine, Vantaa (FI); Jaakko T. Lehtinen, Helsinki (FI)

(73) Assignee: NVIDIA Corporation, Santa Clara, CA (US)

( * ) Notice: Subject to any disclaimer, the term of this patent is extended or adjusted under 35 U.S.C. 154(b) by 779 days.

(21) Appl. No.: 16/156,994

(22) Filed: Oct. 10, 2018

(65) Prior Publication Data

US 2019/0130278 A1    May 2, 2019

Related U.S. Application Data

(60) Provisional application No. 62/577,611, filed on Oct. 26, 2017.

(51) Int. Cl.
*G06N 3/04* (2006.01)
*G06N 3/08* (2006.01)

(52) U.S. Cl.
CPC ............... *G06N 3/088* (2013.01); *G06N 3/04* (2013.01); *G06N 3/082* (2013.01)

(58) Field of Classification Search
CPC ......... G06N 3/04; G06N 3/082; G06N 3/0454
See application file for complete search history.

(56) References Cited

U.S. PATENT DOCUMENTS

| 9,767,381 B2 | 9/2017 | Rodriguez-Serrano et al. |
| 2015/0134583 A1* | 5/2015 | Tamatsu ............ G06N 3/08 706/25 |

(Continued)

FOREIGN PATENT DOCUMENTS

| CN | 106993851 A | 8/2017 |
| CN | 107103590 A | 8/2017 |

(Continued)

OTHER PUBLICATIONS

Beers, Andrew, et al. "High-resolution medical image synthesis using progressively grown generative adversarial networks." arXiv preprint arXiv:1805.03144 (2018). (Year: 2018).*

(Continued)

*Primary Examiner* — Hal Schnee
(74) *Attorney, Agent, or Firm* — Leydig, Voit & Mayer, Ltd.

(57) ABSTRACT

A generative adversarial neural network (GAN) learns a particular task by being shown many examples. In one scenario, a GAN may be trained to generate new images including specific objects, such as human faces, bicycles, etc. Rather than training a complex GAN having a predetermined topology of features and interconnections between the features to learn the task, the topology of the GAN is modified as the GAN is trained for the task. The topology of the GAN may be simple in the beginning and become more complex as the GAN learns during the training, eventually evolving to match the predetermined topology of the complex GAN. In the beginning the GAN learns large-scale details for the task (bicycles have two wheels) and later, as the GAN becomes more complex, learns smaller details (the wheels have spokes).

20 Claims, 13 Drawing Sheets

(56) References Cited

U.S. PATENT DOCUMENTS

| | | |
|---|---|---|
| 2017/0345140 A1 | 11/2017 | Zhang et al. |
| 2017/0365038 A1 | 12/2017 | Denton et al. |
| 2018/0046894 A1* | 2/2018 | Yao .................. G06F 7/5443 |
| 2018/0225823 A1 | 8/2018 | Zhou et al. |
| 2018/0330511 A1* | 11/2018 | Ha .................... G06K 9/6203 |
| 2020/0184262 A1* | 6/2020 | Chui .................. A61B 5/7267 |
| 2020/0285939 A1* | 9/2020 | Baker ................ G06N 3/084 |
| 2021/0133576 A1* | 5/2021 | Hutter ............... G06N 3/084 |
| 2021/0217219 A1* | 7/2021 | Zhou .................. G06T 7/75 |

FOREIGN PATENT DOCUMENTS

| | | | |
|---|---|---|---|
| CN | 107392973 A | 11/2017 | |
| CN | 107423700 A | 12/2017 | |
| CN | 107423701 A | 12/2017 | |
| CN | 107451994 A | 12/2017 | |
| CN | 107563509 A | 1/2018 | |
| CN | 107590530 A | 1/2018 | |
| CN | 107798669 A | 3/2018 | |
| CN | 107945118 A | 4/2018 | |
| CN | 107992944 A | 5/2018 | |
| CN | 107993190 A | 5/2018 | |
| CN | 108009058 A | 5/2018 | |
| CN | 108334847 A | 7/2018 | |
| EP | 3557490 A1 * | 10/2019 | ............ G06N 3/082 |

OTHER PUBLICATIONS

English (machine) translation of Schutera, EP 3557490 A1 (Year: 2019).*

Karras et al,, "Progressive Growing of GANs for Improved Quality, Stability, and Variation," ICLR 2018, Feb. 26, 2018, retrieved from https://arxiv.org/abs/1710.10196, 24 pages.

Isola et al., "Image-to-Image Translation with Conditional Adversarial Networks," 2017 IEEE Conference on Computer Vision and Pattern Recognition, Nov. 22, 2017, retrieved from https://arxiv.org/pdf/1611.07004.pdf, 10 pages.

Wang et al., "Structural inference embedded adversarial networks for scene parsing," PLOS One, Apr. 12, 2018, 29 pages.

* cited by examiner

PROGRESSIVE MODIFICATION OF GENERATIVE ADVERSARIAL NEURAL NETWORKS

CLAIM OF PRIORITY

This application claims the benefit of U.S. Provisional Application No. 62/577,611 (Attorney Docket No. NVIDP1193+/17-HE-0239-USO) titled "Progressive Growing of Generative Adversarial Networks," filed Oct. 26, 2017, the entire contents of which is incorporated herein by reference.

FIELD OF THE INVENTION

The present invention relates to generative adversarial neural networks (GANs), and in particular, to modifying a topology of a GAN during training.

BACKGROUND

Generative adversarial neural networks (GANs) can be used for producing new output data after the GAN is trained for a particular task. For example, a GAN may be trained to generate new images after being trained using a high-dimensional distribution of example images. Recently, generative methods are finding widespread use, for example in speech synthesis, image-to-image translation, and image inpainting. However, there are serious practical problems in training GANs successfully. Training is often unstable, synthesized images tend to be unrealistic, and the variability of outputs can suddenly deteriorate during training, a phenomenon known as mode collapse.

Conventional techniques for training generative models each have significant strengths and weaknesses. Autoregressive models produce sharp images but are slow to evaluate and do not have a latent representation as autoregressive models directly model the conditional distribution over pixels, potentially limiting their applicability. Variational autoenoders (VAEs) are easy to train but tend to produce blurry results due to restrictions in the model. Conventional GANs produce sharp images, albeit only in fairly small resolutions and with somewhat limited variation, and the training continues to be unstable despite recent progress. Hybrid methods combine various strengths of the autoregressive models, VAEs, and GANs, but lag behind GANs in image quality.

Typically, a GAN consists of two neural networks: a generator and a discriminator (aka critic). The generator produces a sample, e.g., an image, from a latent code, and the distribution of the images produced by the generator should ideally be indistinguishable from the distribution of images used to train the GAN. Because a function is not available to confirm that the distributions do match, the discriminator is trained to perform this assessment. The discriminator is differentiable, and, during training, gradients are computed to steer the generator towards producing outputs that more closely resemble the training images. Typically, the discriminator implements an adaptive loss function and the discriminator is discarded once the generator has been trained.

When the differences between images in the training distribution and the generated distribution are measured, the gradients can point to more or less random directions if the distributions do not have substantial overlap, i.e., the generated images are too easy to tell apart from the training images. As the resolution of the generated images improves, training of the generator may become more difficult because higher resolution makes it easier for the discriminator to tell the generated images apart from the training images, thus drastically amplifying the computed gradients and discouraging convergence of the generator. There is a need for addressing these issues and/or other issues associated with the prior art.

SUMMARY

A GAN learns a particular task by being shown many examples. In one scenario, a GAN may be trained to generate new images including specific objects, such as human faces, bicycles, etc. Rather than training a complex GAN having a predetermined topology of features and interconnections between the features to learn the task, the topology of the GAN is modified as the GAN is trained for the task. The topology of the GAN may be simple in the beginning and become more complex as the GAN learns during the training, eventually evolving to match the predetermined topology of the complex GAN. In the beginning, the GAN learns large-scale details for the task (bicycles have two wheels) and later, as the GAN becomes more complex, learns smaller details (the wheels have spokes).

A method, computer readable medium, and system are disclosed for progressively modifying the topology of a GAN during training. The GAN comprises a generator neural network coupled to a discriminator neural network. The GAN is trained for a first time duration, where the topology of the GAN comprises features and interconnections between the features within the generator neural network and within the discriminator neural network. The topology of the GAN is modified to produce a modified GAN and the modified GAN is then trained for a second time duration.

DETAILED DESCRIPTION

A training technique for a GAN is disclosed that modifies the topology of the GAN by adding or removing layers (e.g. fully-connected layer, convolutional layer, upsampling, pooling, normalization, capsule, and the like), adding or removing features (e.g. feature maps, neurons, activations, and the like), adding or removing connections between features, and the like. In an embodiment, modifications of the GAN topology change a processing capacity of the generator neural network and/or the discriminator neural network comprising the GAN. For example, training may start using low-resolution images, and as resolution of the images is progressively increased, processing layers may be added to the GAN. Such a progressive technique allows the training to first discover a large-scale structure of the image distribution and then shift attention to increasingly finer scale detail, instead of having to learn all scales simultaneously.

Figure 1A:
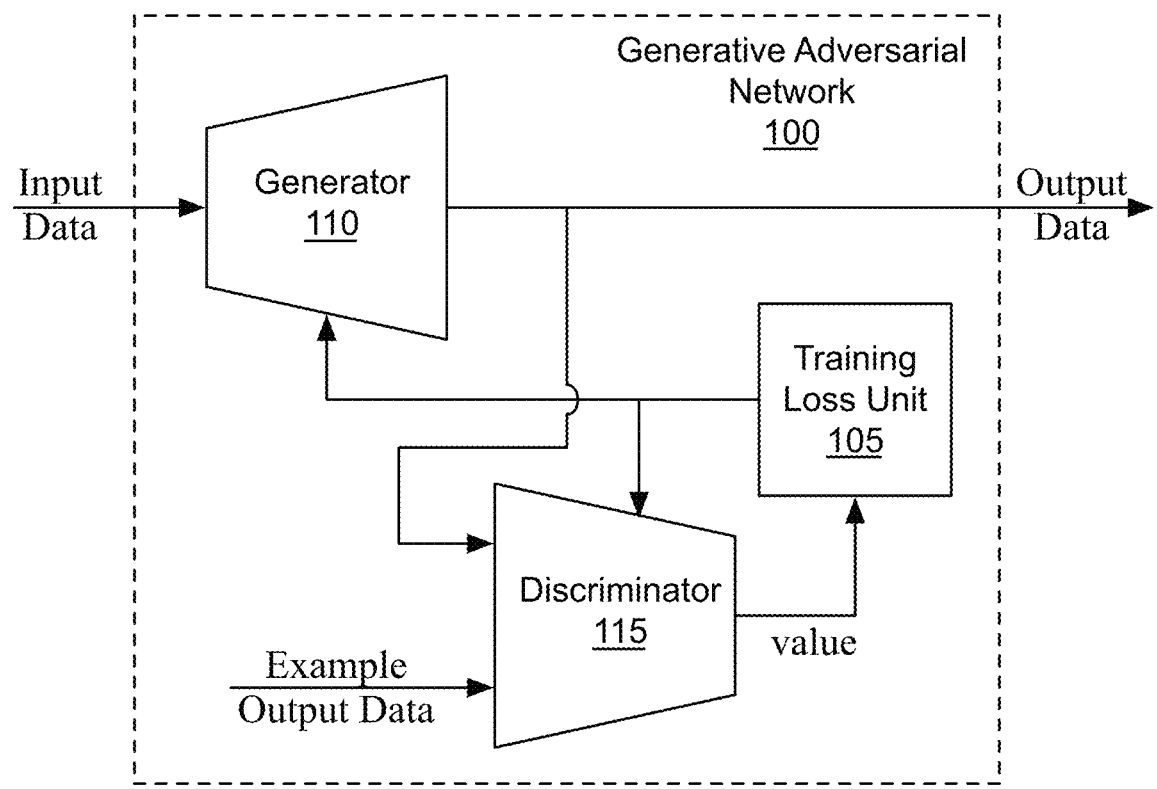
FIG. 1A illustrates a block diagram of a GAN system, in accordance with an embodiment.

FIG. 1A illustrates a block diagram of a GAN 100, in accordance with an embodiment. The GAN 100 may be implemented by a program, custom circuitry, or by a combination of custom circuitry and a program. For example, the GAN 100 may be implemented using a GPU (graphics processing unit), CPU (central processing unit), or any processor capable of performing the operations described herein. Furthermore, persons of ordinary skill in the art will understand that any system that performs the operations of the GAN 100 is within the scope and spirit of embodiments of the present invention.

The GAN 100 includes a generator (neural network) 110, a discriminator (neural network) 115, and a training loss unit 105. Topologies of both the generator 110 and discriminator 115 may be modified during training. The GAN 100 may operate in an unsupervised setting or in a conditional setting. The generator 110 receives input data and produces output data. In the unsupervised setting, the input data may be a latent code, i.e., a random N-dimensional vector drawn from e.g. a Gaussian distribution. Depending on the task, the output data may be an image, audio, video, or other types of data (configuration setting). The discriminator 115 is an adaptive loss function that is used during training of the generator 110. The generator 110 and discriminator 115 are trained simultaneously using a training dataset that includes example output data that the output data produced by the generator 110 should be consistent with. The generator 110 generates output data in response to the input data and the discriminator 115 determines if the output data appears similar to the example output data included in the training data.

In the unsupervised setting, the discriminator 115 outputs a continuous value indicating how closely the output data matches the example output data. For example, in an embodiment, the discriminator 115 outputs a first training stimulus (e.g., high value) when the output data is determined to match the example output data and a second training stimulus (e.g., low value) when the output data is determined to not match the example output data. The training loss unit 105 adjusts parameters (weights) of the GAN 100 based on the output of the discriminator 115.

When the generator 110 is trained for a specific task, such as generating images of bicycles, the discriminator outputs a high value when the output data is an image of a bicycle. The output data generated by the generator 110 is not required to be identical to the example output data for the discriminator 115 to determine the output data matches the example output data. In the context of the following description, the discriminator 115 determines that the output data matches the example output data when the output data is similar to any of the example output data.

In the conditional setting, the input data to the generator 110 may include other (additional) data, such as an image, a classification label (e.g., "BICYCLE"), segmentation contours (e.g., outlines of objects), and other types of data (distribution, audio, etc.). The additional data may be specified in addition to the random latent code, or the additional data may replace the random latent code altogether. The training dataset may include input/output data pairs, and the task of the discriminator 115 may be to determine if the output data of the generator 110 appears consistent with the input, based on the example input/output pairs that the discriminator 115 has seen in the training data.

More illustrative information will now be set forth regarding various optional architectures and features with which the foregoing framework may be implemented, per the desires of the user. It should be strongly noted that the following information is set forth for illustrative purposes and should not be construed as limiting in any manner. Any of the following features may be optionally incorporated with or without the exclusion of other features described.

Figure 1B:
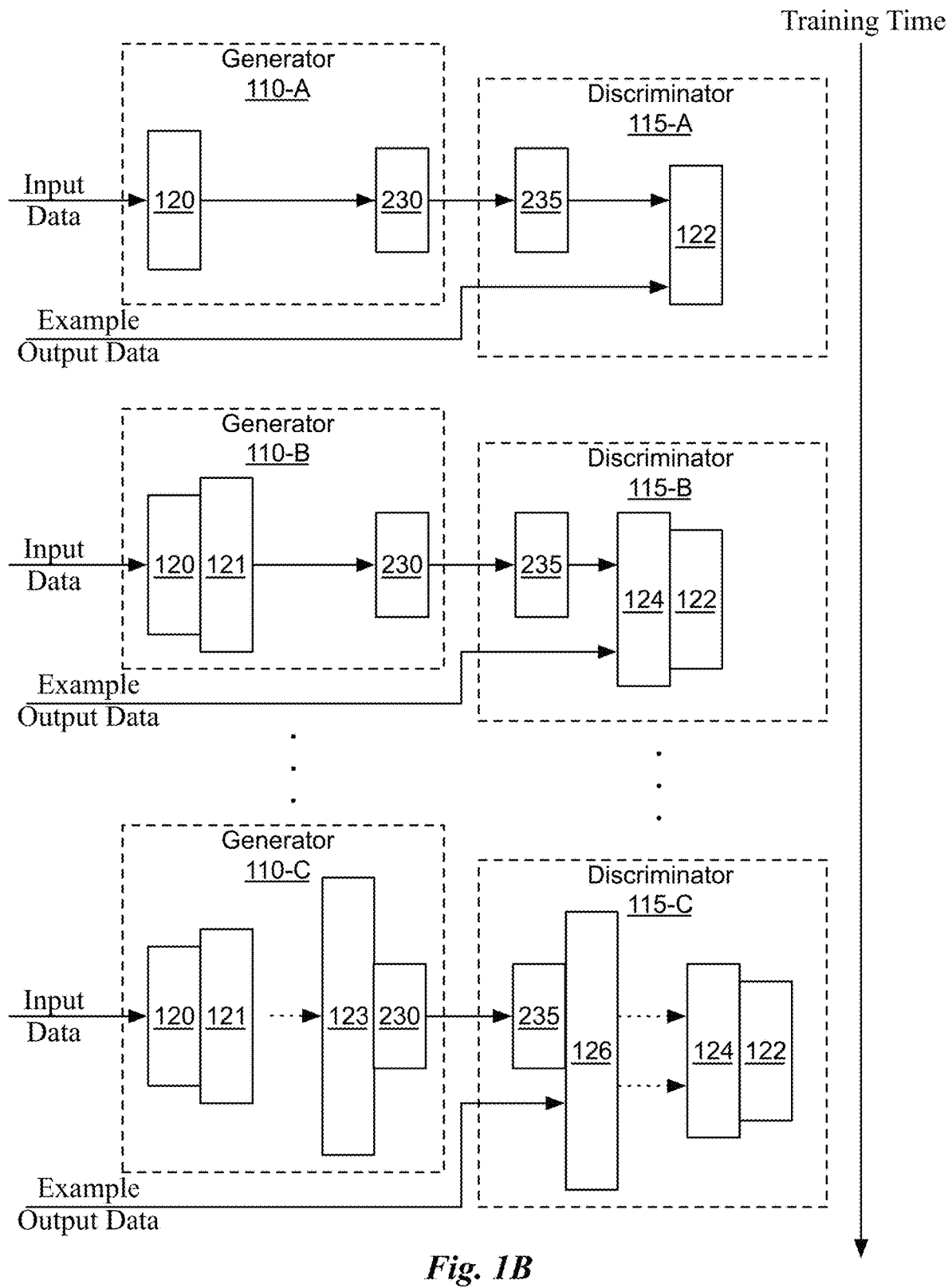
FIG. 1B illustrates a conceptual diagram of GAN topology modifications during training, in accordance with an embodiment.

FIG. 1B illustrates a conceptual diagram of modifications of the GAN 100 topology during training, in accordance with an embodiment. Training of the GAN 100 begins at the top of FIG. 1B and continues to the bottom of FIG. 1B as the topology of the GAN 100 is modified. During training, the topology of the GAN 100 is modified to add or remove layers, add or remove features (e.g. feature maps or neurons), add or remove connections between features, and the like. As shown in FIG. 1B, layers are added to both the generator 110 and the discriminator 115.

In an embodiment, the parameters of the generator 110-A and discriminator 115-A may each be initialized with random values. In an embodiment, the weights are initialized by drawing them from a unit Gaussian distribution and at runtime, the weighs are scaled according to $\hat{w}_i = w_i/c$, where $w_i$ are the weights and c is a per-layer normalization constant. The benefit of scaling the weights at runtime instead of during initialization is somewhat subtle and relates to the scale-invariance in commonly used adaptive stochastic gradient descent methods. The adaptive stochastic gradient descent methods normalize a gradient update by an estimated standard deviation, thus making the update independent of the scale of the parameter. As a result, if some parameters have a larger dynamic range than others, those parameters will take longer to adjust. Scaling the weights by the per-layer normalization constant ensures that the dynamic range, and thus the learning speed, is the same for all weights.

In an embodiment, modifications of the GAN 100 topology change a processing capacity of the generator 110 and/or the discriminator 115. For example, one or more layers may be added, modifying the topology of GAN 100 and increasing the processing capacity. When the GAN 100 is trained to generate images, both the generator 110 and discriminator 115 are simultaneously and progressively modified, with the training starting with easier low-resolution images, and adding new layers that introduce higher-resolution details as the training progresses. More specifically, the GAN 100 may initially be configured with the generator 110-A and the discriminator 115-A, each comprising only a few layers 120 and 122, respectively, to process example output data having a spatial resolution of 4×4 pixels and generate output data having a spatial resolution of 4×4 pixels. A conversion layer 230 included in the generator 110-A projects feature vectors to the output data format. For example, when the generator 110 is trained for an image generation task, the conversion layer 230 projects feature vectors to RGB colors, producing an output image. A conversion layer 235 included in the discriminator 115-A projects the output data format to feature vectors. When the discriminator 115 is trained for an image generation task, the conversion layer 235 projects the RGB colors to feature vectors. In an embodiment, the conversion layer 230 and conversion layer 235 perform 1×1 convolutions.

In an embodiment, the one or more layers 120 includes two convolutional layers. For example, a 4×4 convolutional layer may be followed by a 3×3 convolutional layer. Similarly, the one or more layers 122 may include three convolutional layers and a downsample layer. For example, a 1×1 convolutional layer may be followed by two 3×3 convolutional layers, where the one or more layers 122 processes the output data generated by the generator 110-A and the example output data. The resolution of the example output data included in the training data may be decreased to match the spatial resolution of the generated output images.

As the training progresses, the topology of the GAN 100 is modified by increasing the number of layers and increasing the resolution of the example images. Layers 121 and layers 124 are added to the generator 110-A and the discriminator 115-A, respectively, producing the generator 110-B and the discriminator 115-B, and increasing the spatial resolution of the generated output images. For example, the spatial resolution of the example output images and the generated output images may be increased from a spatial resolution of 4×4 pixels to a spatial resolution of 8×8 pixels. In an embodiment, the layers 121 includes an upsample layer and two 3×3 convolutional layers. Similarly, the layers 124 may include two 3×3 convolutional layers and a downsample layer.

As the training progresses even further, the topology of the GAN 100 is modified by adding progressively more layers, eventually including layers 123 and layers 126 to the generator 110-B and the discriminator 115-B, respectively, producing the generator 110-C and the discriminator 115-C, and increasing the spatial resolution of the generated output images. For example, the spatial resolution of the example output images and the generated output images may be increased to a spatial resolution of 1024×1024 pixels. In an embodiment, the layers 123 includes an upsample layer, two 3×3 convolutional layers, and a 1×1 convolutional layer. Similarly, the layers 126 may include a 3×3 convolutional layer, a 4×4 convolutional layer, and a fully-connected layer.

The parameters for all existing layers can be updated throughout the training process, meaning one or more weights for any layer of the generator 110 and/or the discriminator 115 may be updated during the training. The weight associated with each feature controls a contribution or impact that the feature has on the output of the layer. Rather than directly setting a value of each weight, the weights are learned during training. The training loss unit 105 updates the weight values of the discriminator 115 to better distinguish between the output data produced by the generator 110 and the example output data, and it updates the weight values of the generator 110 to reduce differences between the output data produced by the generator 110 and the example output data.

Beginning training of the GAN 100 with lower resolutions provides stability for each topology of the GAN 100, even when the number of layers increases to generate high resolution output images. Progressively modifying the topology during training also reduces training time compared with beginning training with all of the layers. When the training dataset includes high resolution example images, the example images included in the training dataset are modified (downsampled) before being input to the discriminator 115 until the generator 110 generates the final high resolution images. Importantly, the GAN 100 includes a single generator 110 and a single discriminator 115. The final topology of the GAN 100 may be predetermined and one or more layers are added or removed as the GAN 100 is trained for each increment of output data resolution (increasing or decreasing).

Although training of the GAN 100 is described in the context of image generation, additional input data (in the conditional setting) may be data other than image data and the generator 110 and discriminator 115 may be trained for the generator 110 to generate the other data using the progressive modification technique. Depending on the task, the output data may be an image, audio, video, or other types of data (configuration setting). The resolution of the output data or processing capacity of the GAN 100 is progressively modified as the topology is modified.

Figure 1C:
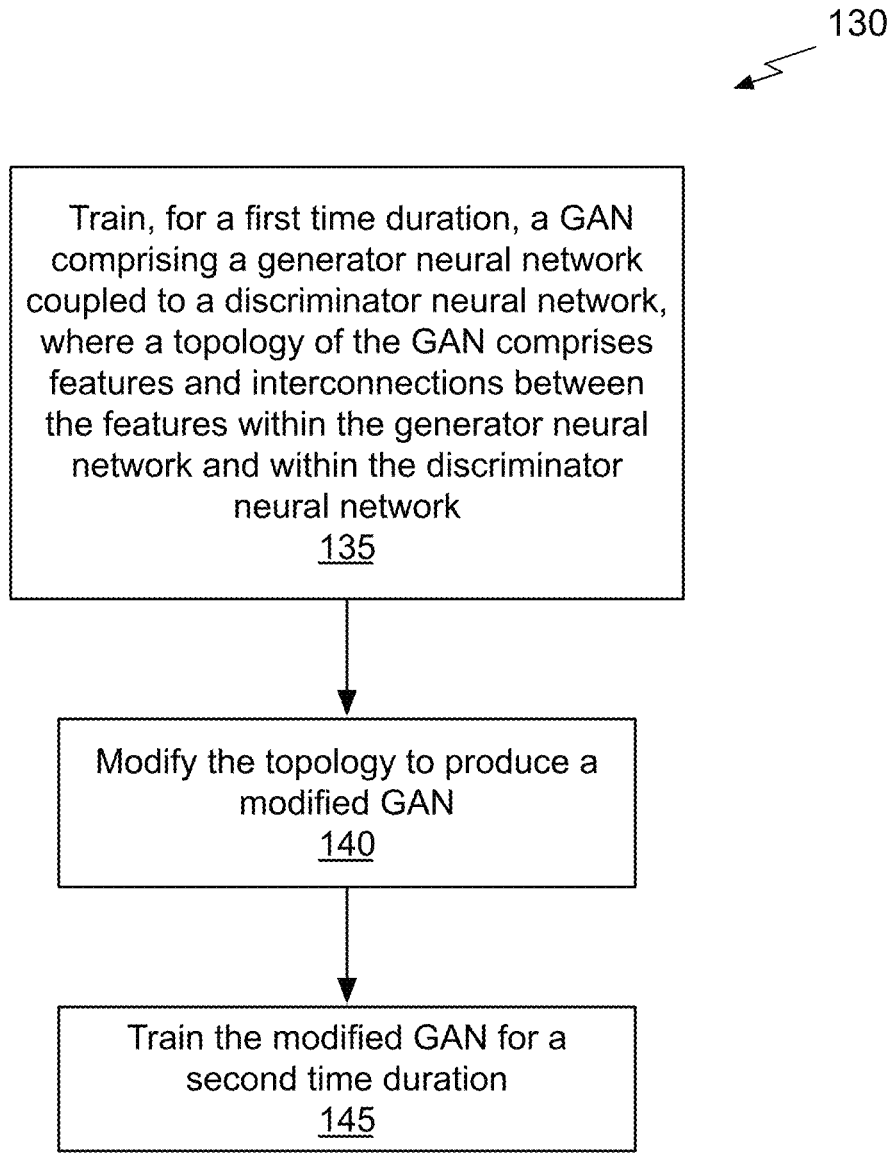
FIG. 1C illustrates a flowchart of a method for modifying the topology of the GAN during training, in accordance with an embodiment.

FIG. 1C illustrates a flowchart of a method 130 for modifying the topology of the GAN during training, in accordance with an embodiment. The method 130 may be performed by a program, custom circuitry, or by a combination of custom circuitry and a program. For example, the method 130 may be executed by a GPU (graphics processing unit), CPU (central processing unit), or any processor capable of performing the generator neural network and discriminator neural network operations. Furthermore, persons of ordinary skill in the art will understand that any system that performs method 130 is within the scope and spirit of embodiments of the present invention.

At step 135, the GAN 100 is trained for a first time duration, where a topology of the GAN 100 comprises features and interconnections between the features within the generator 110 and within the discriminator 115. In an embodiment, the GAN 100 processes three-dimensional image data. In an embodiment, the GAN 100 processes audio data. In an embodiment, training data includes example output data, and, during training, the generator 110 processes input data to produce output data. In an embodiment, the example output data is modified to produce modified training data for input to the discriminator 115 along with the output data. The training loss unit 105 receives the output of the discriminator 115 and produces updated parameters for the GAN 100.

In an embodiment, modifying the training data comprises increasing or decreasing a density of the example output data. For example, a spatial resolution of the example output data may be decreased. In one embodiment, the training data includes additional (example) input data, such as an image, a classification label, segmentation contours, and other types of data (distribution, audio, etc.), and the additional input data are paired with the example output data.

At step 140, the topology of the GAN 100 is modified to produce a modified GAN 100. In an embodiment, modifying the topology changes a processing capacity of the generator 110 and/or the discriminator 115. In an embodiment, the modifications to the GAN 100 and example training images are task-specific. For example, in an embodiment, the topology is modified by adding one or more layers (e.g. fully-connected layer, convolutional layer, upsampling, pooling, normalization, capsule, and the like), adding or removing features (e.g. feature maps, neurons, activations, and the like), adding or removing connections between features, and the like, in the generator 110 and/or the discriminator 115. For a different task, the topology may be modified by removing one or more layers, adding or removing features, adding or removing connections between features, and the like, in the generator 110 and/or the discriminator 115.

At step 145, the modified GAN 100 is trained for a second time duration. In an embodiment, the modified training data for the first time duration is different compared with the modified training data for the second time duration. In an embodiment, the modified training data for the first time duration is modified according to a first function and the modified training data for the second time duration is modified according to a second function that is different than the first function. In an embodiment, the training data is image data and an amount by which the pixel resolution of the training data is decreased for the first time duration is greater compared with the second time duration.

Figure 2A:
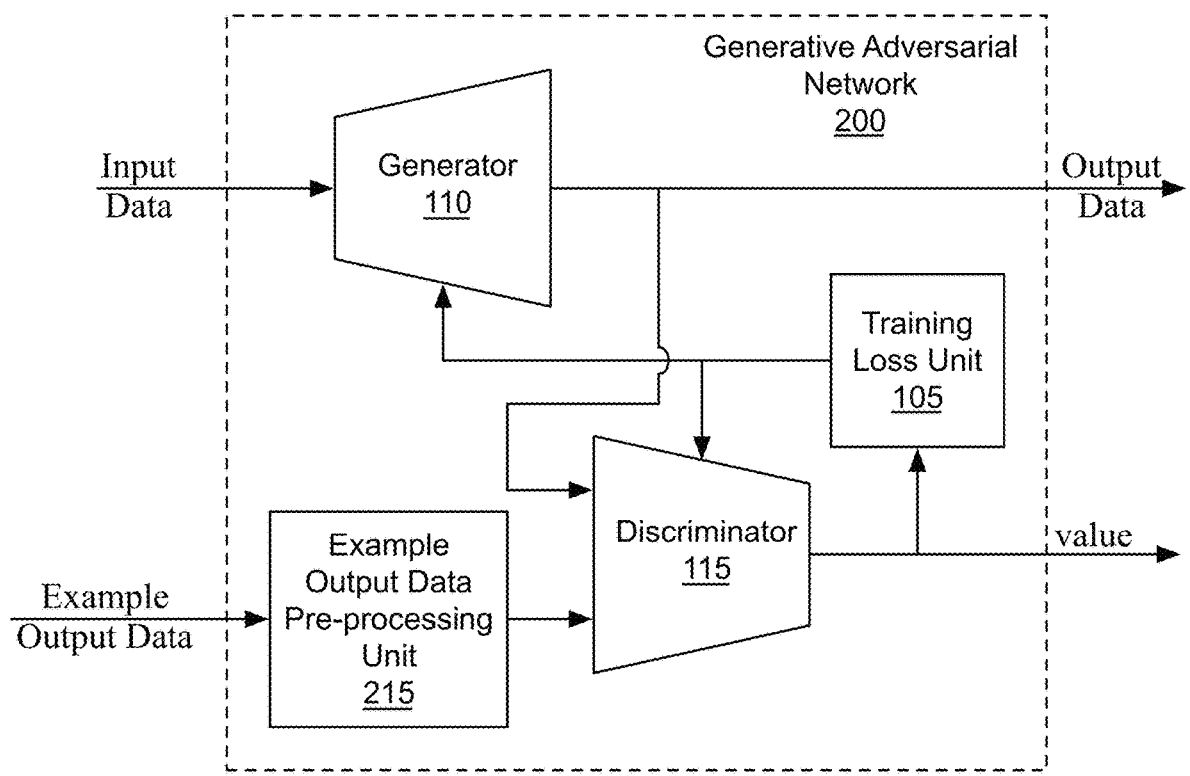
FIG. 2A illustrates a block diagram of another GAN system, in accordance with an embodiment.

FIG. 2A illustrates a block diagram of another GAN 200, in accordance with an embodiment. In addition to the generator 110, discriminator 115, and training loss unit 105, the GAN 200 includes an example output data pre-processing unit 215. The example output data pre-processing unit 215 is configured to modify the example output data included with the training data according to the current topology of the GAN 200. The density of the example output data may be increased or decreased before being input to the discriminator 115. When the example output data is images, the spatial resolution of the images may be increased or decreased by upsampling or downsampling, respectively.

In an embodiment, the modifications to the topology are introduced smoothly by interpolating between the old and new topology and the old and new training data. The generator 110 and discriminator 115 may be configured to smoothly modify the topology and the example output data pre-processing unit 215 may be configured to smoothly transition from first modified example output data to second modified example output data. Smoothing the transitions reduces sudden shocks to the already well-trained, GAN 200 having a first topology. For example, the first topology having low capacity layers may be well-trained, so a second topology with additional layers is gradually introduced during training as the training data is correspondingly gradually modified for the second topology.

Figure 2B:
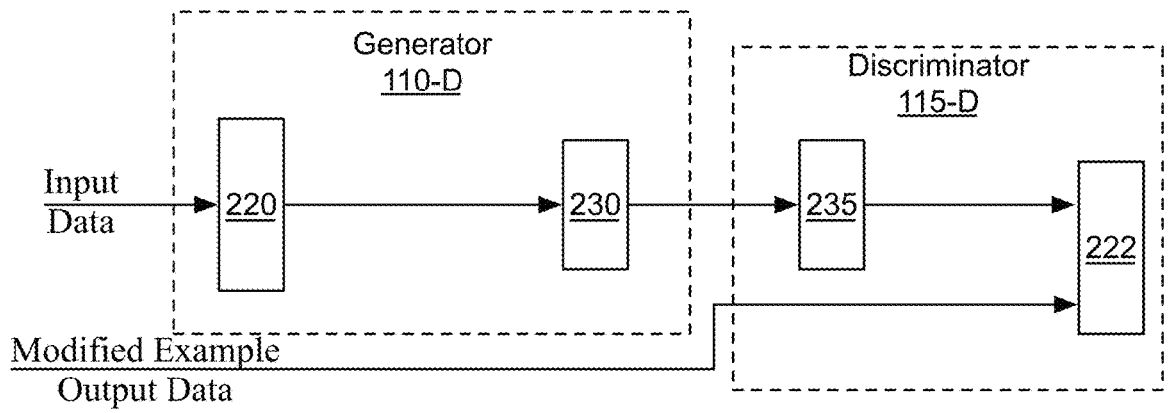
FIG. 2B illustrates technique for providing smoothly modifying the GAN topology, in accordance with an embodiment.
Figure 2B:
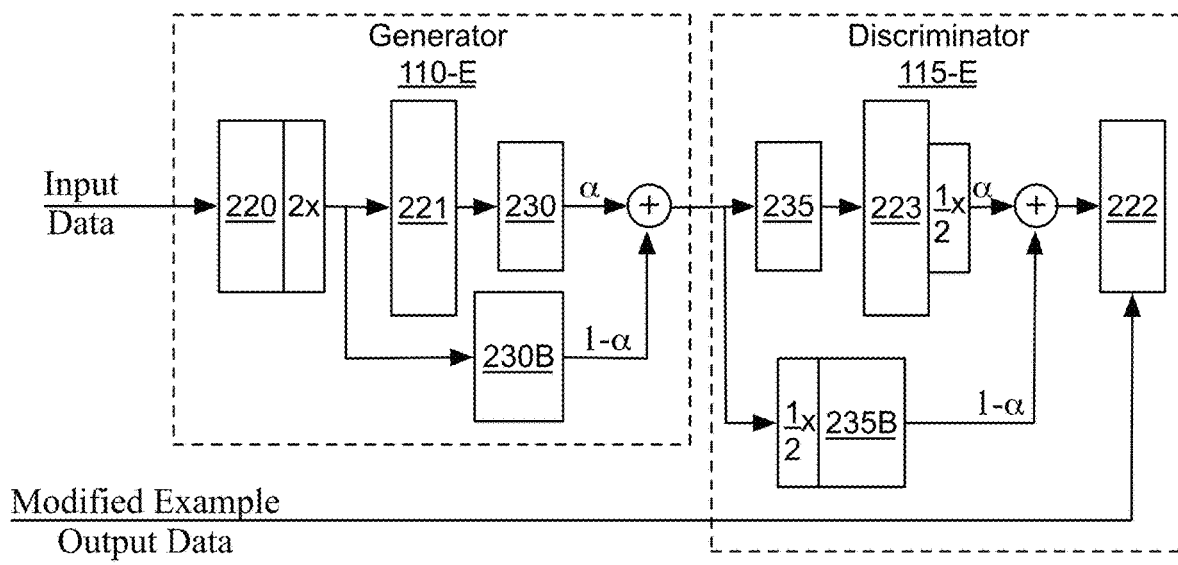
Figure 2B:
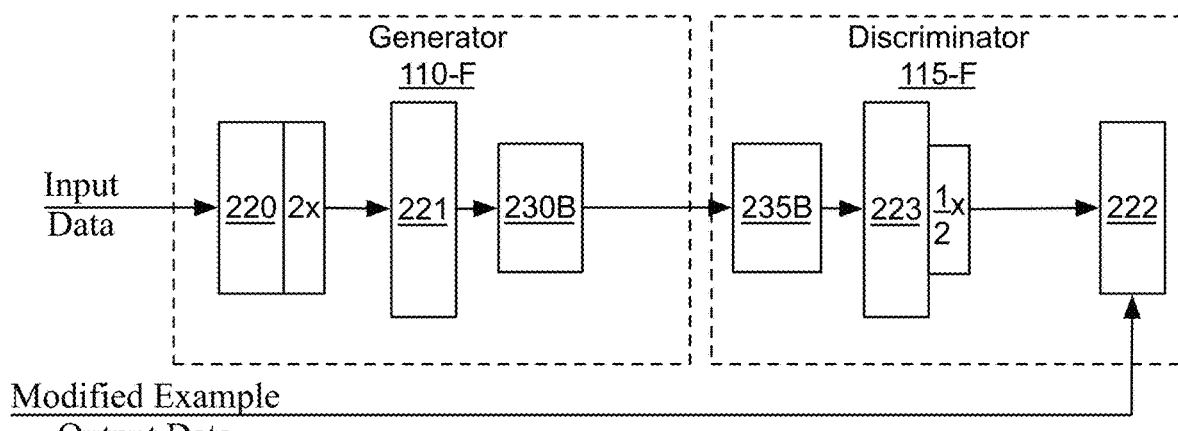

FIG. 2B illustrates technique for smoothly modifying the GAN 200 topology, in accordance with an embodiment. The generator 110-D and the discriminator 115-D are configured using a first topology. In an embodiment, for the first topology, the modified example output data is 16×16 pixel resolution image data. The modified example output data may be downsampled from higher resolution example output data. The generator 110-D includes one or more layers 220 and the conversion layer 230 that projects feature vectors to the output data format. The discriminator 115-D includes the conversion layer 235 and one or more layers 222, where the conversion layer 235 projects the output data format to feature vectors.

The generator 110-D and the discriminator 115-D are trained for a first time duration before transitioning to a second topology. In an embodiment, the processing capacity of the generator 110-D and the discriminator 115-D is doubled as the first topology transitions to the second topology. The transition is shown in FIG. 2B as a generator 110-E and a discriminator 115-E and the second topology is shown in FIG. 2B as a generator 110-F and a discriminator 115-F. In an embodiment, for the second topology, the modified example output data is 32×32 pixel resolution image data. Intermediate data output by the one or more layers 220 are doubled in density (e.g., spatial resolution) and input to one or more layers 221 and a second conversion layer 230B. In an embodiment, nearest neighbor filtering is used to double the intermediate data.

The higher resolution output data generated by the one or more layers 221 corresponding to the second topology is input to the conversion layer 230B. During the transition from the first topology to the second topology, the layers that operate on the higher density data (e.g., one or more layers 221) are treated like a residual block, producing intermediate data that is scaled by a weight a that increases linearly from 0 to 1 during a second time duration. As shown in FIG. 2B, the higher density intermediate data is scaled by a and the intermediate data that is simply doubled in density and corresponds to the first topology is scaled by 1−α. The scaled intermediate data are summed and input to the discriminator 115-E.

The discriminator 115-E includes the conversion layer 235 and a second conversion layer 235B that each project data received from the generator 110-E to feature vectors. Prior to reaching the second conversion layer 235B, density of the data (i.e., spatial resolution) corresponding to the first topology is halved. In an embodiment, average pooling is used to halve the data. One or more layers 223 process the feature vectors to produce processed data corresponding to the second topology. The processed data produced by the one or more layers 223 is halved to produce output data corresponding to the second topology. In an embodiment, the processed data is 32×32 density data that is halved to produce 16×16 density data.

As shown in FIG. 2B, the output data corresponding to the second topology is scaled by a and the output data that is simply halved in density and corresponds to the first topology is scaled by 1−α. The scaled output data are summed and input to the one or more layers 222. In an embodiment, for the second topology, the modified example output data is 16×16 pixel resolution image data. During the topology transition, α is used by the example output data pre-processing unit 215 to interpolate between the 16×16 pixel resolution image data and the 32×32 pixel resolution image data corresponding to the second topology, similarly to how the generator 110-E and discriminator 115-E blends the two topologies. When α reaches 1, the transition to the second topology shown in FIG. 2B as the generator 110-F and the discriminator 115-F is complete.

Although the topology modifications are described in the context of the image generation, the topology modification may also be performed for other tasks. For example, the modifications that remove layers may be performed, by reversing the order of the modifications in FIG. 2B, progressing from bottom to top as the training time increases. In one embodiment, the training data includes additional input data paired with the example output data, such as an image, a classification label, segmentation contours, and other types of data (distribution, audio, etc.), and the additional input data is interpolated for smooth transitions as the topologies are modified.

Figure 2C:
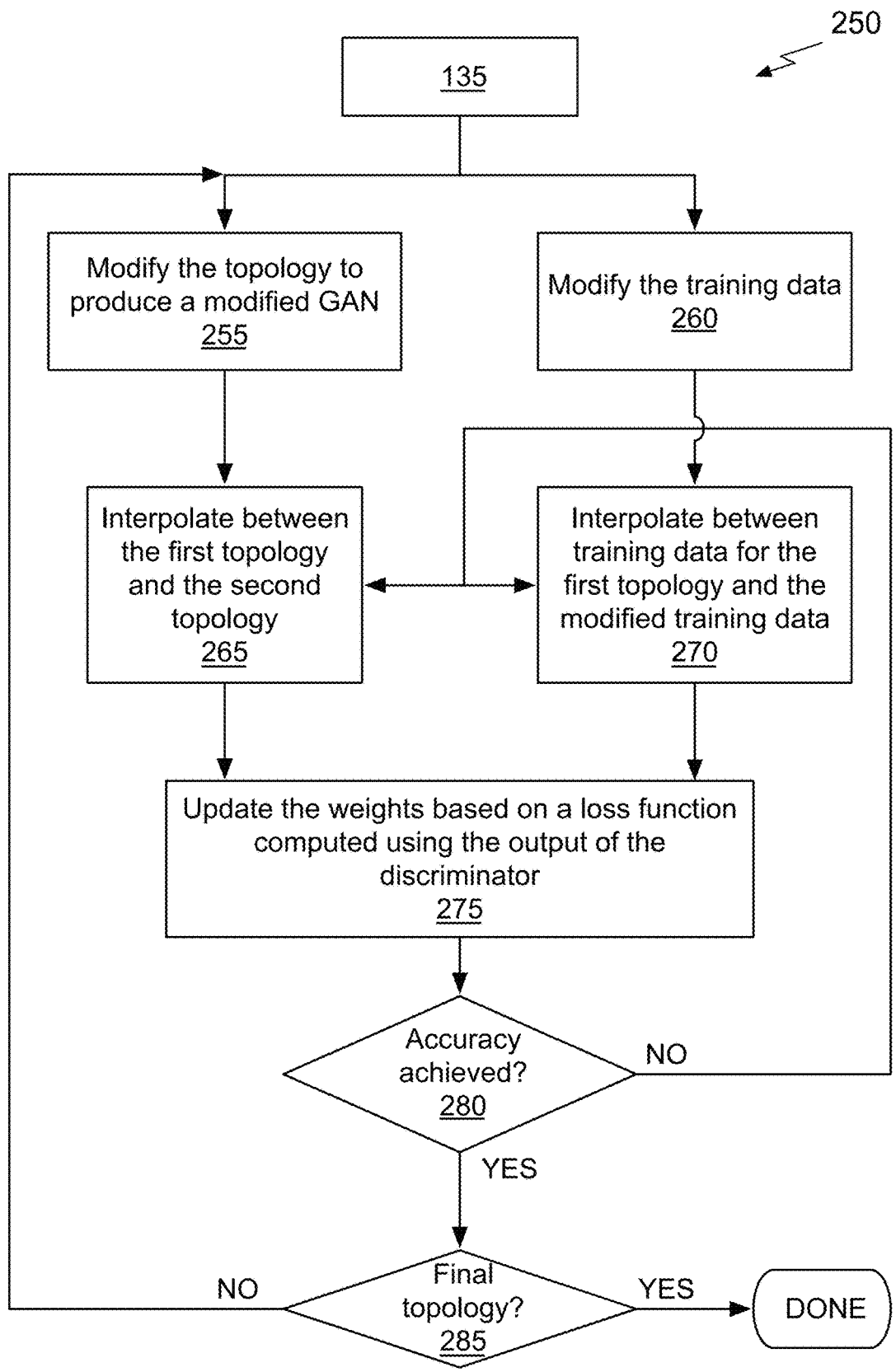
FIG. 2C illustrates a flowchart of a method for smoothly transitioning between GAN topologies, in accordance with an embodiment.

FIG. 2C illustrates a flowchart of a method 250 for smoothly transitioning between GAN topologies, in accordance with an embodiment. The method 250 may be performed by a program, custom circuitry, or by a combination of custom circuitry and a program. For example, the method 250 may be executed by a GPU (graphics processing unit), CPU (central processing unit), or any processor capable of performing generator neural network and discriminator neural network operations. Furthermore, persons of ordinary skill in the art will understand that any system that performs method 250 is within the scope and spirit of embodiments of the present invention.

At step 135, the GAN 100 is trained for a first time duration using a first topology comprising the generator 110-D and the discriminator 115-D. At step 255, the topology of the GAN 100 is modified to produce a modified GAN 100 comprising the generator 110-E and the discriminator 115-E. At step 260, the training data is modified to correspond with an output data density of the second topology. For example, the training data may be downsampled. At step 265, when training the GAN 100 for a second time duration, the GAN 100 is configured to interpolate between the first topology and the second topology. At step 270, when training the GAN 100 for the second time duration, interpolation is performed between the training data for the first topology and the modified training data for the second topology. At step 275, when training the GAN 100 for the second time duration, the weights of the generator 110-E and the discriminator 115-E are updated based on a loss function computed using the output of the discriminator 115-E.

At step 280, the training loss unit 105 determines if a level of accuracy is achieved, and, if not, the training continues. The level of accuracy may be a predetermined threshold value (i.e., criterion). In an embodiment, as the accuracy increases, the value of α controlling the smooth transition from the first topology to the second topology may also increase. Alternatively, a predetermined quantity of the training data may be used to train the GAN 100 for each increment of α.

When the level of accuracy is achieved at step 280, then at step 285 a determination is made whether the GAN 100 matches the final topology. If so, the training is complete. Otherwise, steps 255, 260, 265, 270, 275, and 280 are repeated and the GAN 100 is modified to transition to another topology and training continues. For example, in an embodiment, the topology is further modified by adding one or more layers, adding or removing features, adding or removing connections between features, and the like, in the generator 110 and/or the discriminator 115. For a different task, the topology may be modified by removing one or more layers, adding or removing features, adding or removing connections between features, and the like, in the generator 110 and/or the discriminator 115.

Figure 2D:
FIG. 2D illustrates example images produced by a GAN trained to generate images of bicycles, in accordance with an embodiment.
Figure 2D:
Figure 2D:
Figure 2D:
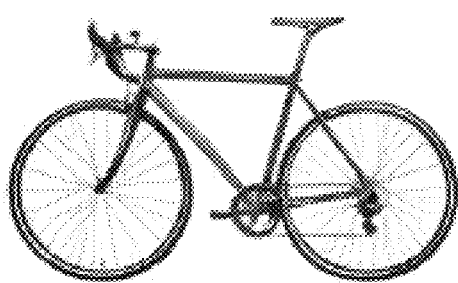
Figure 2D:

FIG. 2D illustrates example images produced by a GAN 100 trained to generate images of bicycles, in accordance with an embodiment. Each image is generated by the generator 110 in response to receiving a latent code input. In an embodiment, the discriminator 115 is used to train the GAN 100, and is not used to generate the images once the training is complete. During training, both the generator 110 and discriminator 115 are progressively modified, transitioning from one topology to another. The example training data is modified during the training, starting with low-resolution images, and increasing the resolution of the images as new layers are added that process higher resolution details. Modifying the GAN 100 during training greatly stabilizes the training and enables the GAN 100 to produce images of unprecedented quality compared with conventional techniques.

Progressively modifying the topology of the GAN 100 offers two main benefits: the GAN 100 converges to a considerably better optimum and the total training time is reduced by about a factor of two. The improved convergence is explained by an implicit form of curriculum learning that is imposed by the gradually increasing capacity of the generator 110 and the discriminator 115. Without progressive modification, all layers of the generator 110 and the discriminator 115 are tasked with simultaneously finding succinct intermediate representations for both the large-scale variation and the small-scale detail. With progressive modification, however, the existing low-density layers are likely to have already converged early on, so the generator 110 and the discriminator 115 are only tasked with refining the representations by increasingly smaller-scale effects as new layers are introduced. For training time, progressive modification gains a significant head start because the generator 110 and the discriminator 115 are shallow and quick to evaluate at the beginning.

Parallel Processing Architecture

Figure 3:
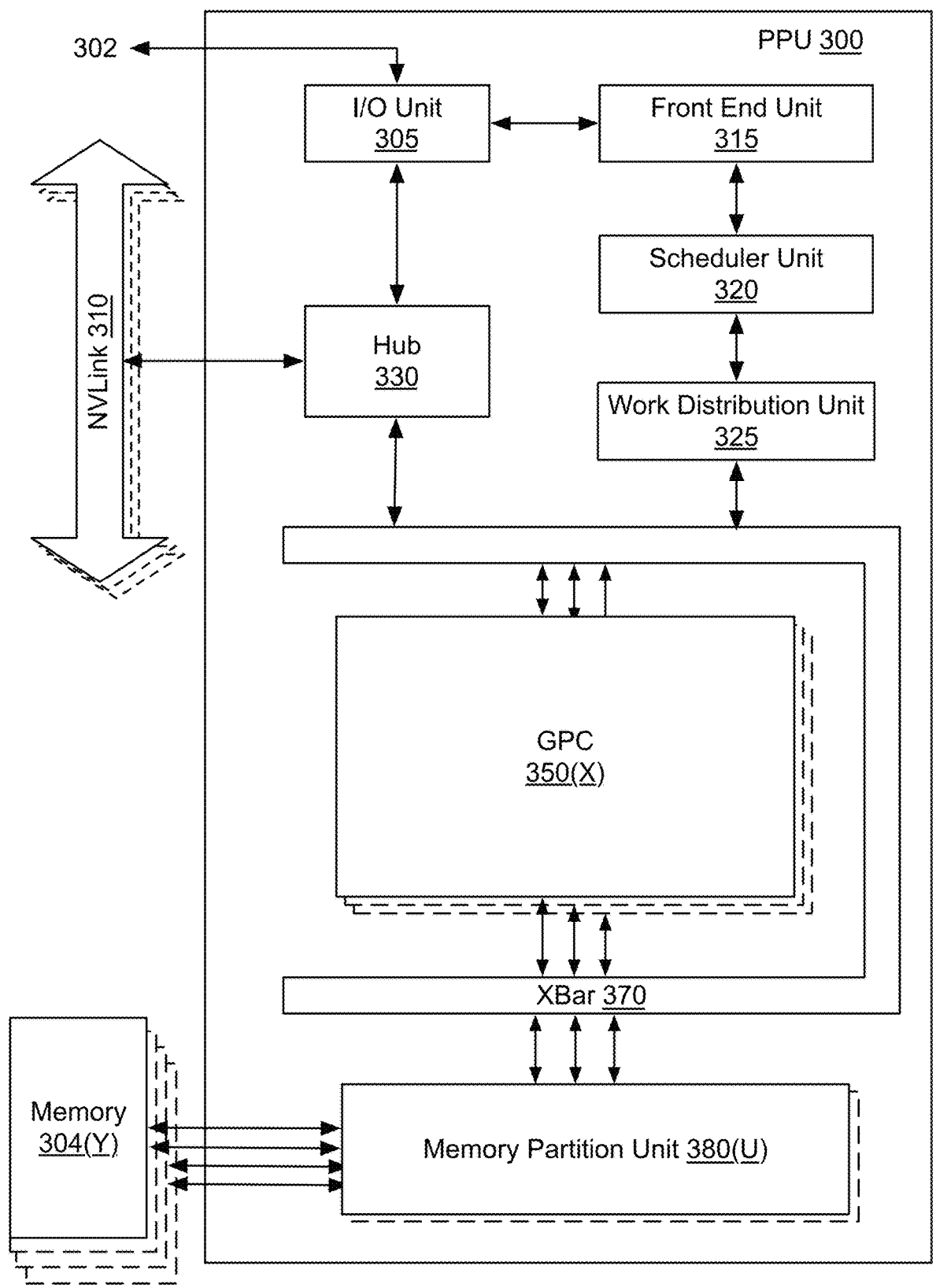
FIG. 3 illustrates a parallel processing unit, in accordance with an embodiment.

FIG. 3 illustrates a parallel processing unit (PPU) 300, in accordance with an embodiment. In an embodiment, the PPU 300 is a multi-threaded processor that is implemented on one or more integrated circuit devices. The PPU 300 is a latency hiding architecture designed to process many threads in parallel. A thread (i.e., a thread of execution) is an instantiation of a set of instructions configured to be executed by the PPU 300. In an embodiment, the PPU 300 is a graphics processing unit (GPU) configured to implement a graphics rendering pipeline for processing three-dimensional (3D) graphics data in order to generate two-dimensional (2D) image data for display on a display device such as a liquid crystal display (LCD) device. In other embodiments, the PPU 300 may be utilized for performing general-purpose computations. While one exemplary parallel processor is provided herein for illustrative purposes, it should be strongly noted that such processor is set forth for illustrative purposes only, and that any processor may be employed to supplement and/or substitute for the same.

One or more PPUs 300 may be configured to accelerate thousands of High Performance Computing (HPC), data center, and machine learning applications. The PPU 300 may be configured to accelerate numerous deep learning systems and applications including autonomous vehicle platforms, deep learning, high-accuracy speech, image, and text recognition systems, intelligent video analytics, molecular simulations, drug discovery, disease diagnosis, weather forecasting, big data analytics, astronomy, molecular dynamics simulation, financial modeling, robotics, factory automation, real-time language translation, online search optimizations, and personalized user recommendations, and the like.

As shown in FIG. 3, the PPU 300 includes an Input/Output (I/O) unit 305, a front end unit 315, a scheduler unit 320, a work distribution unit 325, a hub 330, a crossbar (Xbar) 370, one or more general processing clusters (GPCs) 350, and one or more partition units 380. The PPU 300 may be connected to a host processor or other PPUs 300 via one or more high-speed NVLink 310 interconnect. The PPU 300 may be connected to a host processor or other peripheral devices via an interconnect 302. The PPU 300 may also be connected to a local memory comprising a number of memory devices 304. In an embodiment, the local memory may comprise a number of dynamic random access memory (DRAM) devices. The DRAM devices may be configured as a high-bandwidth memory (HBM) subsystem, with multiple DRAM dies stacked within each device.

The NVLink 310 interconnect enables systems to scale and include one or more PPUs 300 combined with one or more CPUs, supports cache coherence between the PPUs 300 and CPUs, and CPU mastering. Data and/or commands may be transmitted by the NVLink 310 through the hub 330 to/from other units of the PPU 300 such as one or more copy engines, a video encoder, a video decoder, a power management unit, etc. (not explicitly shown). The NVLink 310 is described in more detail in conjunction with FIG. 5B.

The I/O unit 305 is configured to transmit and receive communications (i.e., commands, data, etc.) from a host processor (not shown) over the interconnect 302. The I/O unit 305 may communicate with the host processor directly via the interconnect 302 or through one or more intermediate devices such as a memory bridge. In an embodiment, the I/O unit 305 may communicate with one or more other processors, such as one or more the PPUs 300 via the interconnect 302. In an embodiment, the I/O unit 305 implements a Peripheral Component Interconnect Express (PCIe) interface for communications over a PCIe bus and the interconnect 302 is a PCIe bus. In alternative embodiments, the I/O unit 305 may implement other types of well-known interfaces for communicating with external devices.

The I/O unit 305 decodes packets received via the interconnect 302. In an embodiment, the packets represent commands configured to cause the PPU 300 to perform various operations. The I/O unit 305 transmits the decoded commands to various other units of the PPU 300 as the commands may specify. For example, some commands may be transmitted to the front end unit 315. Other commands may be transmitted to the hub 330 or other units of the PPU 300 such as one or more copy engines, a video encoder, a video decoder, a power management unit, etc. (not explicitly shown). In other words, the I/O unit 305 is configured to route communications between and among the various logical units of the PPU 300.

In an embodiment, a program executed by the host processor encodes a command stream in a buffer that provides workloads to the PPU 300 for processing. A workload may comprise several instructions and data to be processed by those instructions. The buffer is a region in a memory that is accessible (i.e., read/write) by both the host processor and the PPU 300. For example, the I/O unit 305 may be configured to access the buffer in a system memory connected to the interconnect 302 via memory requests transmitted over the interconnect 302. In an embodiment, the host processor writes the command stream to the buffer and then transmits a pointer to the start of the command stream to the PPU 300. The front end unit 315 receives pointers to one or more command streams. The front end unit 315 manages the one or more streams, reading commands from the streams and forwarding commands to the various units of the PPU 300.

The front end unit 315 is coupled to a scheduler unit 320 that configures the various GPCs 350 to process tasks defined by the one or more streams. The scheduler unit 320 is configured to track state information related to the various tasks managed by the scheduler unit 320. The state may indicate which GPC 350 a task is assigned to, whether the task is active or inactive, a priority level associated with the task, and so forth. The scheduler unit 320 manages the execution of a plurality of tasks on the one or more GPCs 350.

The scheduler unit 320 is coupled to a work distribution unit 325 that is configured to dispatch tasks for execution on the GPCs 350. The work distribution unit 325 may track a number of scheduled tasks received from the scheduler unit 320. In an embodiment, the work distribution unit 325 manages a pending task pool and an active task pool for each of the GPCs 350. The pending task pool may comprise a number of slots (e.g., 32 slots) that contain tasks assigned to be processed by a particular GPC 350. The active task pool may comprise a number of slots (e.g., 4 slots) for tasks that are actively being processed by the GPCs 350. As a GPC 350 finishes the execution of a task, that task is evicted from the active task pool for the GPC 350 and one of the other tasks from the pending task pool is selected and scheduled for execution on the GPC 350. If an active task has been idle on the GPC 350, such as while waiting for a data dependency to be resolved, then the active task may be evicted from the GPC 350 and returned to the pending task pool while another task in the pending task pool is selected and scheduled for execution on the GPC 350.

The work distribution unit 325 communicates with the one or more GPCs 350 via XBar 370. The XBar 370 is an interconnect network that couples many of the units of the PPU 300 to other units of the PPU 300. For example, the XBar 370 may be configured to couple the work distribution unit 325 to a particular GPC 350. Although not shown explicitly, one or more other units of the PPU 300 may also be connected to the XBar 370 via the hub 330.

The tasks are managed by the scheduler unit 320 and dispatched to a GPC 350 by the work distribution unit 325. The GPC 350 is configured to process the task and generate results. The results may be consumed by other tasks within the GPC 350, routed to a different GPC 350 via the XBar 370, or stored in the memory 304. The results can be written to the memory 304 via the partition units 380, which implement a memory interface for reading and writing data to/from the memory 304. The results can be transmitted to another PPU 304 or CPU via the NVLink 310. In an embodiment, the PPU 300 includes a number U of partition units 380 that is equal to the number of separate and distinct memory devices 304 coupled to the PPU 300. A partition unit 380 will be described in more detail below in conjunction with FIG. 4B.

In an embodiment, a host processor executes a driver kernel that implements an application programming interface (API) that enables one or more applications executing on the host processor to schedule operations for execution on the PPU 300. In an embodiment, multiple compute applications are simultaneously executed by the PPU 300 and the PPU 300 provides isolation, quality of service (QoS), and independent address spaces for the multiple compute applications. An application may generate instructions (i.e., API calls) that cause the driver kernel to generate one or more tasks for execution by the PPU 300. The driver kernel outputs tasks to one or more streams being processed by the PPU 300. Each task may comprise one or more groups of related threads, referred to herein as a warp. In an embodiment, a warp comprises 32 related threads that may be executed in parallel. Cooperating threads may refer to a plurality of threads including instructions to perform the task and that may exchange data through shared memory. Threads and cooperating threads are described in more detail in conjunction with FIG. 5A.

Figure 4A:
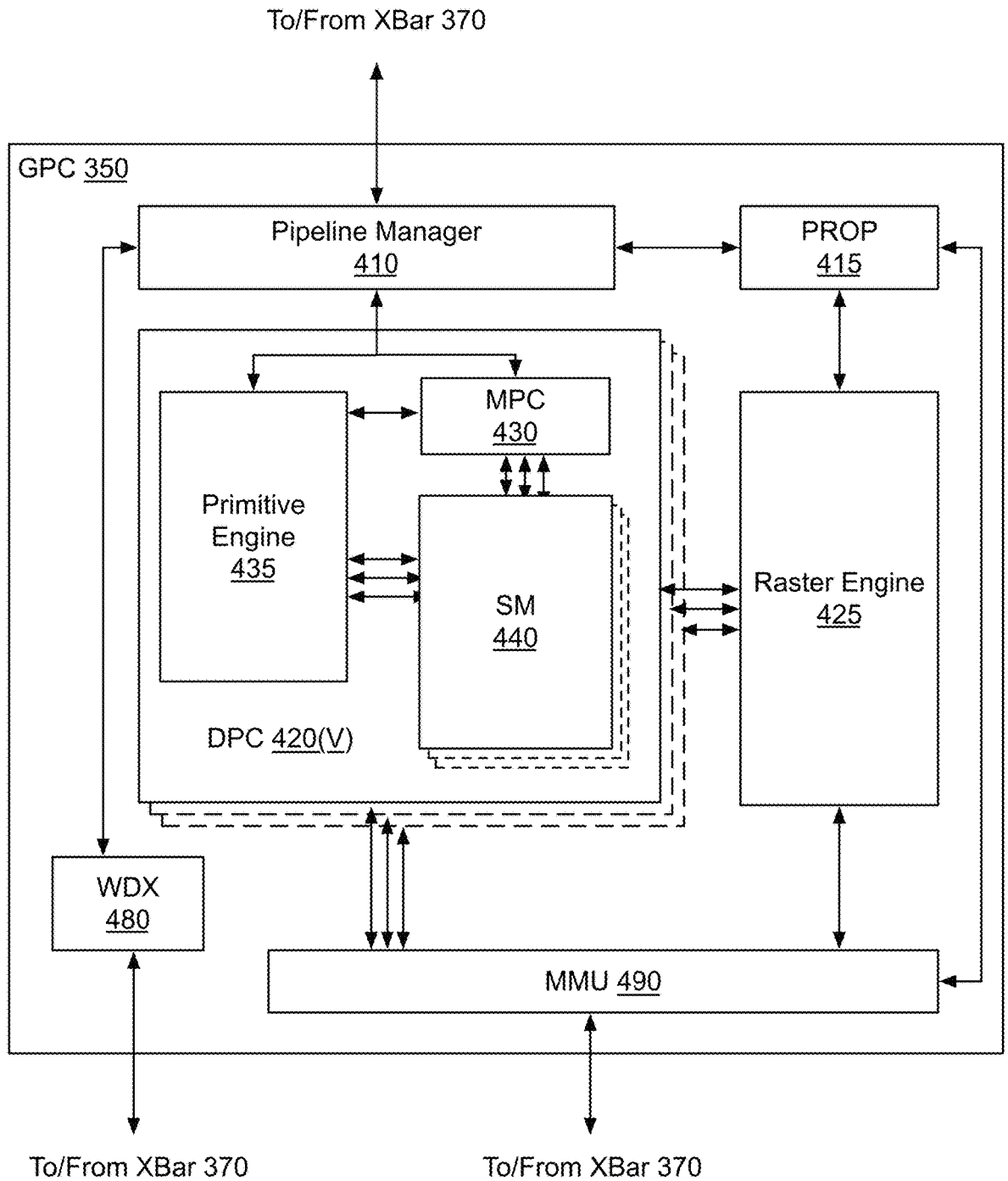
FIG. 4A illustrates a general processing cluster within the parallel processing unit of FIG. 3, in accordance with an embodiment.

FIG. 4A illustrates a GPC 350 of the PPU 300 of FIG. 3, in accordance with an embodiment. As shown in FIG. 4A, each GPC 350 includes a number of hardware units for processing tasks. In an embodiment, each GPC 350 includes a pipeline manager 410, a pre-raster operations unit (PROP) 415, a raster engine 425, a work distribution crossbar (WDX) 480, a memory management unit (MMU) 490, and one or more Data Processing Clusters (DPCs) 420. It will be appreciated that the GPC 350 of FIG. 4A may include other hardware units in lieu of or in addition to the units shown in FIG. 4A.

In an embodiment, the operation of the GPC 350 is controlled by the pipeline manager 410. The pipeline manager 410 manages the configuration of the one or more DPCs 420 for processing tasks allocated to the GPC 350. In an embodiment, the pipeline manager 410 may configure at least one of the one or more DPCs 420 to implement at least a portion of a graphics rendering pipeline. For example, a DPC 420 may be configured to execute a vertex shader program on the programmable streaming multiprocessor (SM) 440. The pipeline manager 410 may also be configured to route packets received from the work distribution unit 325 to the appropriate logical units within the GPC 350. For example, some packets may be routed to fixed function hardware units in the PROP 415 and/or raster engine 425 while other packets may be routed to the DPCs 420 for processing by the primitive engine 435 or the SM 440. In an embodiment, the pipeline manager 410 may configure at least one of the one or more DPCs 420 to implement a neural network model and/or a computing pipeline.

Figure 4B:
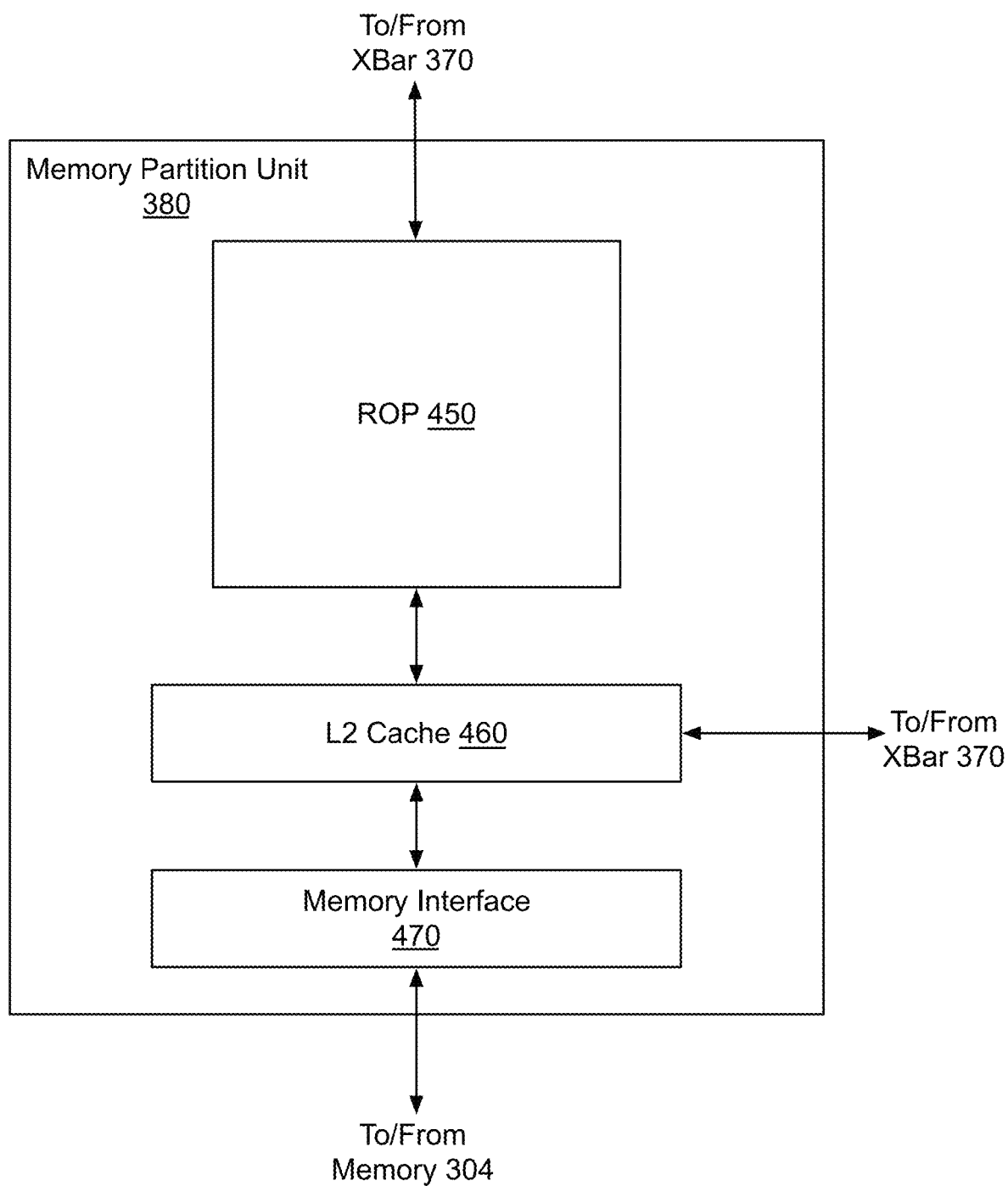
FIG. 4B illustrates a memory partition unit of the parallel processing unit of FIG. 3, in accordance with an embodiment.

The PROP unit 415 is configured to route data generated by the raster engine 425 and the DPCs 420 to a Raster Operations (ROP) unit, described in more detail in conjunction with FIG. 4B. The PROP unit 415 may also be configured to perform optimizations for color blending, organize pixel data, perform address translations, and the like.

The raster engine 425 includes a number of fixed function hardware units configured to perform various raster operations. In an embodiment, the raster engine 425 includes a setup engine, a coarse raster engine, a culling engine, a clipping engine, a fine raster engine, and a tile coalescing engine. The setup engine receives transformed vertices and generates plane equations associated with the geometric primitive defined by the vertices. The plane equations are transmitted to the coarse raster engine to generate coverage information (e.g., an x,y coverage mask for a tile) for the primitive. The output of the coarse raster engine is transmitted to the culling engine where fragments associated with the primitive that fail a z-test are culled, and transmitted to a clipping engine where fragments lying outside a viewing frustum are clipped. Those fragments that survive clipping and culling may be passed to the fine raster engine to generate attributes for the pixel fragments based on the plane equations generated by the setup engine. The output of the raster engine 425 comprises fragments to be processed, for example, by a fragment shader implemented within a DPC 420.

Each DPC 420 included in the GPC 350 includes an M-Pipe Controller (MPC) 430, a primitive engine 435, and one or more SMs 440. The MPC 430 controls the operation of the DPC 420, routing packets received from the pipeline manager 410 to the appropriate units in the DPC 420. For example, packets associated with a vertex may be routed to the primitive engine 435, which is configured to fetch vertex attributes associated with the vertex from the memory 304. In contrast, packets associated with a shader program may be transmitted to the SM 440.

The SM 440 comprises a programmable streaming processor that is configured to process tasks represented by a number of threads. Each SM 440 is multi-threaded and configured to execute a plurality of threads (e.g., 32 threads) from a particular group of threads concurrently. In an embodiment, the SM 440 implements a SIMD (Single-Instruction, Multiple-Data) architecture where each thread in a group of threads (i.e., a warp) is configured to process a different set of data based on the same set of instructions. All threads in the group of threads execute the same instructions. In another embodiment, the SM 440 implements a SIMT (Single-Instruction, Multiple Thread) architecture where each thread in a group of threads is configured to process a different set of data based on the same set of instructions, but where individual threads in the group of threads are allowed to diverge during execution. In an embodiment, a program counter, call stack, and execution state is maintained for each warp, enabling concurrency between warps and serial execution within warps when threads within the warp diverge. In another embodiment, a program counter, call stack, and execution state is maintained for each individual thread, enabling equal concurrency between all threads, within and between warps. When execution state is maintained for each individual thread, threads executing the same instructions may be converged and executed in parallel for maximum efficiency. The SM 440 will be described in more detail below in conjunction with FIG. 5A.

The MMU 490 provides an interface between the GPC 350 and the partition unit 380. The MMU 490 may provide translation of virtual addresses into physical addresses, memory protection, and arbitration of memory requests. In an embodiment, the MMU 490 provides one or more translation lookaside buffers (TLBs) for performing translation of virtual addresses into physical addresses in the memory 304.

FIG. 4B illustrates a memory partition unit 380 of the PPU 300 of FIG. 3, in accordance with an embodiment. As shown in FIG. 4B, the memory partition unit 380 includes a Raster Operations (ROP) unit 450, a level two (L2) cache 460, and a memory interface 470. The memory interface 470 is coupled to the memory 304. Memory interface 470 may implement 32, 64, 128, 1024-bit data buses, or the like, for high-speed data transfer. In an embodiment, the PPU 300 incorporates U memory interfaces 470, one memory interface 470 per pair of partition units 380, where each pair of partition units 380 is connected to a corresponding memory device 304. For example, PPU 300 may be connected to up to Y memory devices 304, such as high bandwidth memory stacks or graphics double-data-rate, version 5, synchronous dynamic random access memory, or other types of persistent storage.

In an embodiment, the memory interface 470 implements an HBM2 memory interface and Y equals half U. In an embodiment, the HBM2 memory stacks are located on the same physical package as the PPU 300, providing substantial power and area savings compared with conventional GDDR5 SDRAM systems. In an embodiment, each HBM2 stack includes four memory dies and Y equals 4, with HBM2 stack including two 128-bit channels per die for a total of 8 channels and a data bus width of 1024 bits.

In an embodiment, the memory 304 supports Single-Error Correcting Double-Error Detecting (SECDED) Error Correction Code (ECC) to protect data. ECC provides higher reliability for compute applications that are sensitive to data corruption. Reliability is especially important in large-scale cluster computing environments where PPUs 300 process very large datasets and/or run applications for extended periods.

In an embodiment, the PPU 300 implements a multi-level memory hierarchy. In an embodiment, the memory partition unit 380 supports a unified memory to provide a single unified virtual address space for CPU and PPU 300 memory, enabling data sharing between virtual memory systems. In an embodiment the frequency of accesses by a PPU 300 to memory located on other processors is traced to ensure that memory pages are moved to the physical memory of the PPU 300 that is accessing the pages more frequently. In an embodiment, the NVLink 310 supports address translation services allowing the PPU 300 to directly access a CPU's page tables and providing full access to CPU memory by the PPU 300.

In an embodiment, copy engines transfer data between multiple PPUs 300 or between PPUs 300 and CPUs. The copy engines can generate page faults for addresses that are not mapped into the page tables. The memory partition unit 380 can then service the page faults, mapping the addresses into the page table, after which the copy engine can perform the transfer. In a conventional system, memory is pinned (i.e., non-pageable) for multiple copy engine operations between multiple processors, substantially reducing the available memory. With hardware page faulting, addresses can be passed to the copy engines without worrying if the memory pages are resident, and the copy process is transparent.

Data from the memory 304 or other system memory may be fetched by the memory partition unit 380 and stored in the L2 cache 460, which is located on-chip and is shared between the various GPCs 350. As shown, each memory partition unit 380 includes a portion of the L2 cache 460 associated with a corresponding memory device 304. Lower level caches may then be implemented in various units within the GPCs 350. For example, each of the SMs 440 may implement a level one (L1) cache. The L1 cache is private memory that is dedicated to a particular SM 440. Data from the L2 cache 460 may be fetched and stored in each of the L1 caches for processing in the functional units of the SMs 440. The L2 cache 460 is coupled to the memory interface 470 and the XBar 370.

The ROP unit 450 performs graphics raster operations related to pixel color, such as color compression, pixel blending, and the like. The ROP unit 450 also implements depth testing in conjunction with the raster engine 425, receiving a depth for a sample location associated with a pixel fragment from the culling engine of the raster engine 425. The depth is tested against a corresponding depth in a depth buffer for a sample location associated with the fragment. If the fragment passes the depth test for the sample location, then the ROP unit 450 updates the depth buffer and transmits a result of the depth test to the raster engine 425. It will be appreciated that the number of partition units 380 may be different than the number of GPCs 350 and, therefore, each ROP unit 450 may be coupled to each of the GPCs 350. The ROP unit 450 tracks packets received from the different GPCs 350 and determines which GPC 350 that a result generated by the ROP unit 450 is routed to through the Xbar 370. Although the ROP unit 450 is included within the memory partition unit 380 in FIG. 4B, in other embodiment, the ROP unit 450 may be outside of the memory partition unit 380. For example, the ROP unit 450 may reside in the GPC 350 or another unit.

Figure 5A:
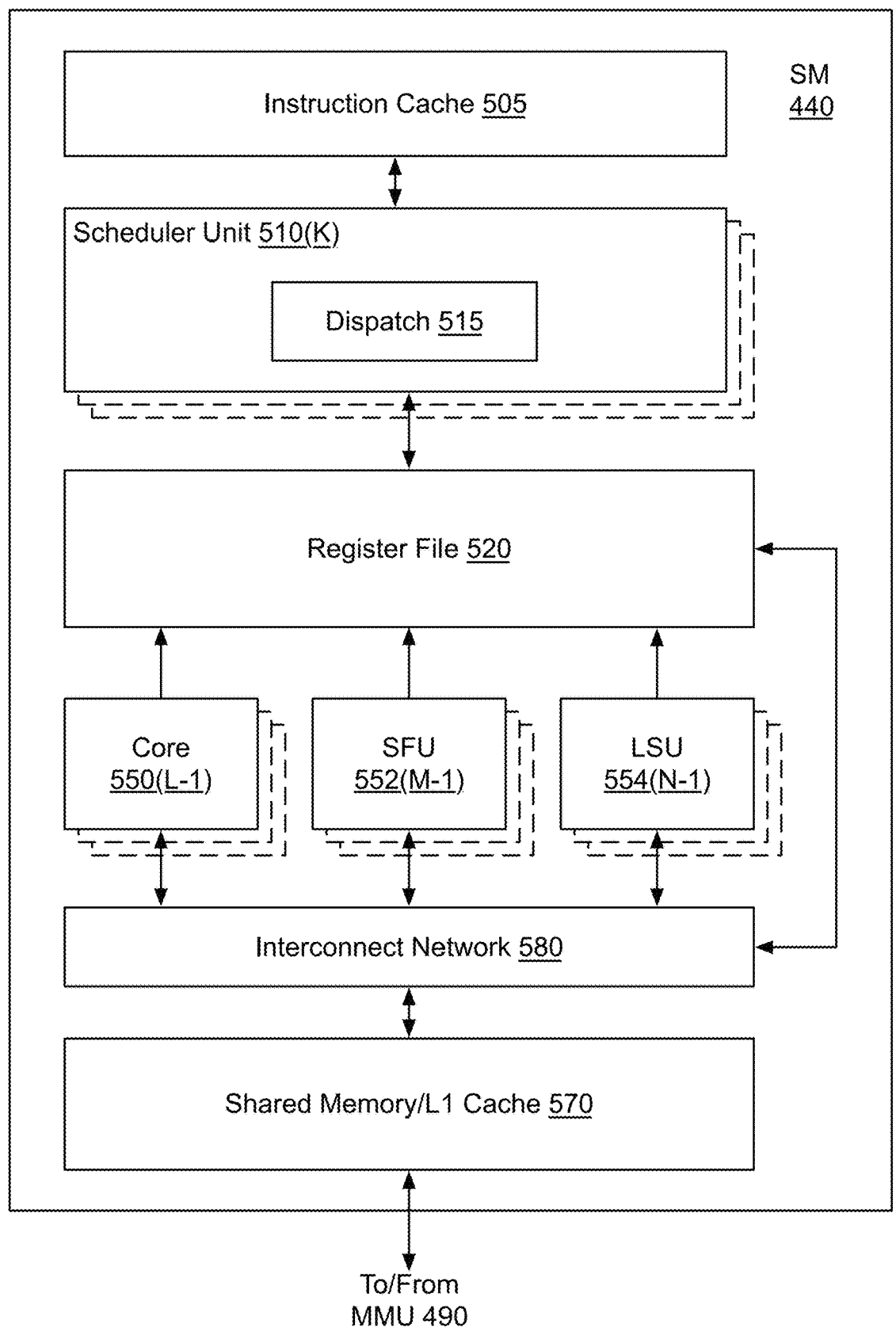
FIG. 5A illustrates the streaming multi-processor of FIG. 4A, in accordance with an embodiment.

FIG. 5A illustrates the streaming multi-processor 440 of FIG. 4A, in accordance with an embodiment. As shown in FIG. 5A, the SM 440 includes an instruction cache 505, one or more scheduler units 510, a register file 520, one or more processing cores 550, one or more special function units (SFUs) 552, one or more load/store units (LSUs) 554, an interconnect network 580, a shared memory/L1 cache 570.

As described above, the work distribution unit 325 dispatches tasks for execution on the GPCs 350 of the PPU 300. The tasks are allocated to a particular DPC 420 within a GPC 350 and, if the task is associated with a shader program, the task may be allocated to an SM 440. The scheduler unit 510 receives the tasks from the work distribution unit 325 and manages instruction scheduling for one or more thread blocks assigned to the SM 440. The scheduler unit 510 schedules thread blocks for execution as warps of parallel threads, where each thread block is allocated at least one warp. In an embodiment, each warp executes 32 threads. The scheduler unit 510 may manage a plurality of different thread blocks, allocating the warps to the different thread blocks and then dispatching instructions from the plurality of different cooperative groups to the various functional units (i.e., cores 550, SFUs 552, and LSUs 554) during each clock cycle.

Cooperative Groups is a programming model for organizing groups of communicating threads that allows developers to express the granularity at which threads are communicating, enabling the expression of richer, more efficient parallel decompositions. Cooperative launch APIs support synchronization amongst thread blocks for the execution of parallel algorithms. Conventional programming models provide a single, simple construct for synchronizing cooperating threads: a barrier across all threads of a thread block (i.e., the syncthreads( ) function). However, programmers would often like to define groups of threads at smaller than thread block granularities and synchronize within the defined groups to enable greater performance, design flexibility, and software reuse in the form of collective group-wide function interfaces.

Cooperative Groups enables programmers to define groups of threads explicitly at sub-block (i.e., as small as a single thread) and multi-block granularities, and to perform collective operations such as synchronization on the threads in a cooperative group. The programming model supports clean composition across software boundaries, so that libraries and utility functions can synchronize safely within their local context without having to make assumptions about convergence. Cooperative Groups primitives enable new patterns of cooperative parallelism, including producer-consumer parallelism, opportunistic parallelism, and global synchronization across an entire grid of thread blocks.

A dispatch unit 515 is configured to transmit instructions to one or more of the functional units. In the embodiment, the scheduler unit 510 includes two dispatch units 515 that enable two different instructions from the same warp to be dispatched during each clock cycle. In alternative embodiments, each scheduler unit 510 may include a single dispatch unit 515 or additional dispatch units 515.

Each SM 440 includes a register file 520 that provides a set of registers for the functional units of the SM 440. In an embodiment, the register file 520 is divided between each of the functional units such that each functional unit is allocated a dedicated portion of the register file 520. In another embodiment, the register file 520 is divided between the different warps being executed by the SM 440. The register file 520 provides temporary storage for operands connected to the data paths of the functional units.

Each SM 440 comprises L processing cores 550. In an embodiment, the SM 440 includes a large number (e.g., 128, etc.) of distinct processing cores 550. Each core 550 may include a fully-pipelined, single-precision, double-precision, and/or mixed precision processing unit that includes a floating point arithmetic logic unit and an integer arithmetic logic unit. In an embodiment, the floating point arithmetic logic units implement the IEEE 754-2008 standard for floating point arithmetic. In an embodiment, the cores 550 include 64 single-precision (32-bit) floating point cores, 64 integer cores, 32 double-precision (64-bit) floating point cores, and 8 tensor cores.

Tensor cores configured to perform matrix operations, and, in an embodiment, one or more tensor cores are included in the cores 550. In particular, the tensor cores are configured to perform deep learning matrix arithmetic, such as convolution operations for neural network training and inferencing. In an embodiment, each tensor core operates on a 4×4 matrix and performs a matrix multiply and accumulate operation D=A×B+C, where A, B, C, and D are 4×4 matrices.

In an embodiment, the matrix multiply inputs A and B are 16-bit floating point matrices, while the accumulation matrices C and D may be 16-bit floating point or 32-bit floating point matrices. Tensor Cores operate on 16-bit floating point input data with 32-bit floating point accumulation. The 16-bit floating point multiply requires 64 operations and results in a full precision product that is then accumulated using 32-bit floating point addition with the other intermediate products for a 4×4×4 matrix multiply. In practice, Tensor Cores are used to perform much larger two-dimensional or higher dimensional matrix operations, built up from these smaller elements. An API, such as CUDA 9 C++ API, exposes specialized matrix load, matrix multiply and accumulate, and matrix store operations to efficiently use Tensor Cores from a CUDA-C++ program. At the CUDA level, the warp-level interface assumes 16×16 size matrices spanning all 32 threads of the warp.

Each SM 440 also comprises M SFUs 552 that perform special functions (e.g., attribute evaluation, reciprocal square root, and the like). In an embodiment, the SFUs 552 may include a tree traversal unit configured to traverse a hierarchical tree data structure. In an embodiment, the SFUs 552 may include texture unit configured to perform texture map filtering operations. In an embodiment, the texture units are configured to load texture maps (e.g., a 2D array of texels) from the memory 304 and sample the texture maps to produce sampled texture values for use in shader programs executed by the SM 440. In an embodiment, the texture maps are stored in the shared memory/L1 cache 470. The texture units implement to fxture operations such as filtering operations using mip-maps (i.e., texture maps of varying levels of detail). In an embodiment, each SM 340 includes two texture units.

Each SM 440 also comprises N LSUs 554 that implement load and store operations between the shared memory/L1 cache 570 and the register file 520. Each SM 440 includes an interconnect network 580 that connects each of the functional units to the register file 520 and the LSU 554 to the register file 520, shared memory/L1 cache 570. In an embodiment, the interconnect network 580 is a crossbar that can be configured to connect any of the functional units to any of the registers in the register file 520 and connect the LSUs 554 to the register file and memory locations in shared memory/L1 cache 570.

The shared memory/L1 cache 570 is an array of on-chip memory that allows for data storage and communication between the SM 440 and the primitive engine 435 and between threads in the SM 440. In an embodiment, the shared memory/L1 cache 570 comprises 128 KB of storage capacity and is in the path from the SM 440 to the partition unit 380. The shared memory/L1 cache 570 can be used to cache reads and writes. One or more of the shared memory/L1 cache 570, L2 cache 460, and memory 304 are backing stores.

Combining data cache and shared memory functionality into a single memory block provides the best overall performance for both types of memory accesses. The capacity is usable as a cache by programs that do not use shared memory. For example, if shared memory is configured to use half of the capacity, texture and load/store operations can use the remaining capacity. Integration within the shared memory/L1 cache 570 enables the shared memory/L1 cache 570 to function as a high-throughput conduit for streaming data while simultaneously providing high-bandwidth and low-latency access to frequently reused data.

When configured for general purpose parallel computation, a simpler configuration can be used compared with graphics processing. Specifically, the fixed function graphics processing units shown in FIG. 3, are bypassed, creating a much simpler programming model. In the general purpose parallel computation configuration, the work distribution unit 325 assigns and distributes blocks of threads directly to the DPCs 420. The threads in a block execute the same program, using a unique thread ID in the calculation to ensure each thread generates unique results, using the SM 440 to execute the program and perform calculations, shared memory/L1 cache 570 to communicate between threads, and the LSU 554 to read and write global memory through the shared memory/L1 cache 570 and the memory partition unit 380. When configured for general purpose parallel computation, the SM 440 can also write commands that the scheduler unit 320 can use to launch new work on the DPCs 420.

The PPU 300 may be included in a desktop computer, a laptop computer, a tablet computer, servers, supercomputers, a smart-phone (e.g., a wireless, hand-held device), personal digital assistant (PDA), a digital camera, a vehicle, a head mounted display, a hand-held electronic device, and the like. In an embodiment, the PPU 300 is embodied on a single semiconductor substrate. In another embodiment, the PPU 300 is included in a system-on-a-chip (SoC) along with one or more other devices such as additional PPUs 300, the memory 204, a reduced instruction set computer (RISC) CPU, a memory management unit (MMU), a digital-to-analog converter (DAC), and the like.

In an embodiment, the PPU 300 may be included on a graphics card that includes one or more memory devices 304. The graphics card may be configured to interface with a PCIe slot on a motherboard of a desktop computer. In yet another embodiment, the PPU 300 may be an integrated graphics processing unit (iGPU) or parallel processor included in the chipset of the motherboard.

Exemplary Computing System

Systems with multiple GPUs and CPUs are used in a variety of industries as developers expose and leverage more parallelism in applications such as artificial intelligence computing. High-performance GPU-accelerated systems with tens to many thousands of compute nodes are deployed in data centers, research facilities, and supercomputers to solve ever larger problems. As the number of processing devices within the high-performance systems increases, the communication and data transfer mechanisms need to scale to support the increased bandwidth.

Figure 5B:
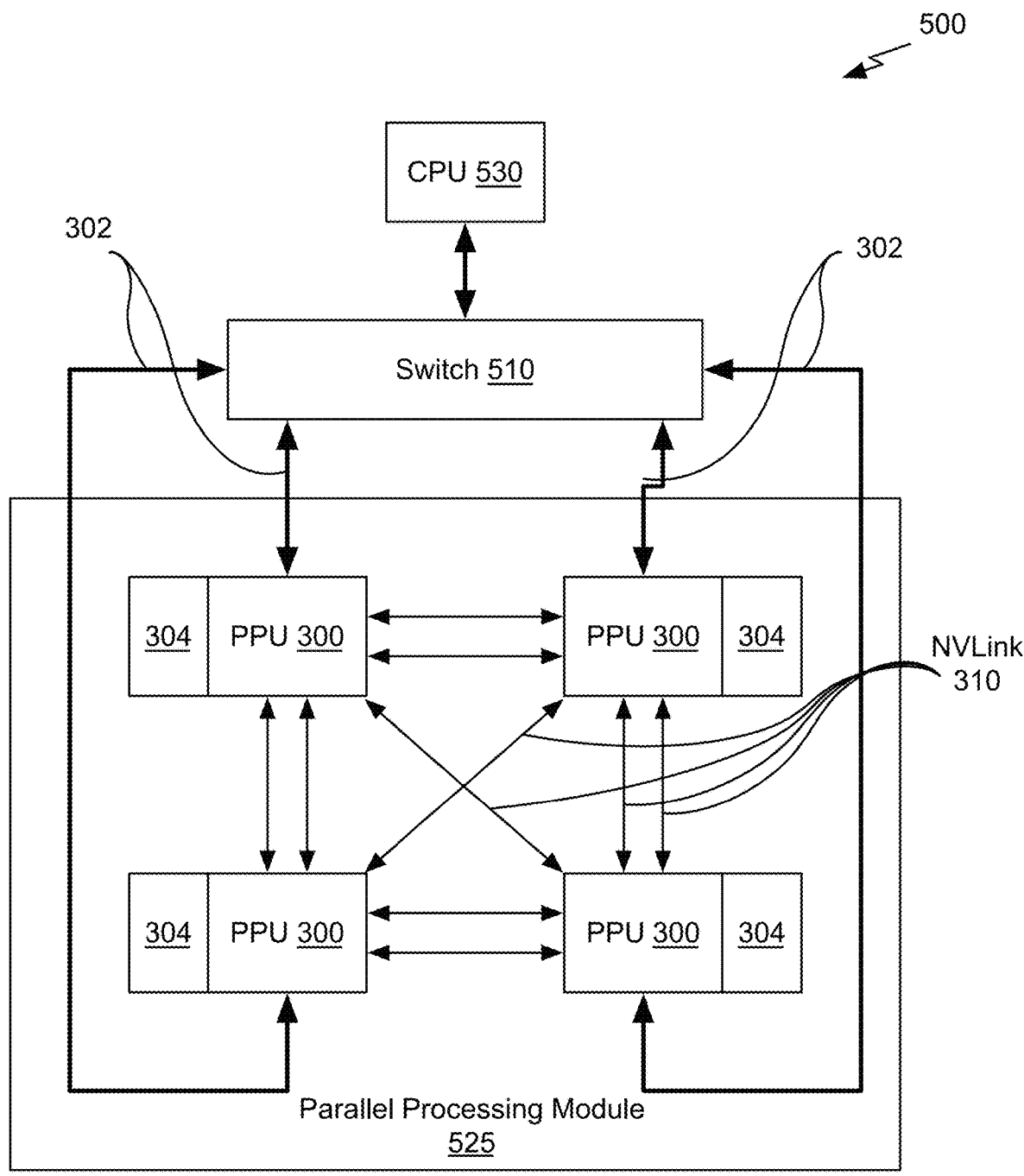
FIG. 5B is a conceptual diagram of a processing system implemented using the PPU of FIG. 3, in accordance with an embodiment.

FIG. 5B is a conceptual diagram of a processing system 500 implemented using the PPU 300 of FIG. 3, in accordance with an embodiment. The exemplary system 565 may be configured to implement the method 130 shown in FIG. 1C and/or the method 250 shown in FIG. 2C. The processing system 500 includes a CPU 530, switch 510, and multiple PPUs 300 each and respective memories 304. The NVLink 310 provides high-speed communication links between each of the PPUs 300. Although a particular number of NVLink 310 and interconnect 302 connections are illustrated in FIG.

5B, the number of connections to each PPU 300 and the CPU 530 may vary. The switch 510 interfaces between the interconnect 302 and the CPU 530. The PPUs 300, memories 304, and NVLinks 310 may be situated on a single semiconductor platform to form a parallel processing module 525. In an embodiment, the switch 510 supports two or more protocols to interface between various different connections and/or links.

In another embodiment (not shown), the NVLink 310 provides one or more high-speed communication links between each of the PPUs 300 and the CPU 530 and the switch 510 interfaces between the interconnect 302 and each of the PPUs 300. The PPUs 300, memories 304, and interconnect 302 may be situated on a single semiconductor platform to form a parallel processing module 525. In yet another embodiment (not shown), the interconnect 302 provides one or more communication links between each of the PPUs 300 and the CPU 530 and the switch 510 interfaces between each of the PPUs 300 using the NVLink 310 to provide one or more high-speed communication links between the PPUs 300. In another embodiment (not shown), the NVLink 310 provides one or more high-speed communication links between the PPUs 300 and the CPU 530 through the switch 510. In yet another embodiment (not shown), the interconnect 302 provides one or more communication links between each of the PPUs 300 directly. One or more of the NVLink 310 high-speed communication links may be implemented as a physical NVLink interconnect or either an on-chip or on-die interconnect using the same protocol as the NVLink 310.

In the context of the present description, a single semiconductor platform may refer to a sole unitary semiconductor-based integrated circuit fabricated on a die or chip. It should be noted that the term single semiconductor platform may also refer to multi-chip modules with increased connectivity which simulate on-chip operation and make substantial improvements over utilizing a conventional bus implementation. Of course, the various circuits or devices may also be situated separately or in various combinations of semiconductor platforms per the desires of the user. Alternately, the parallel processing module 525 may be implemented as a circuit board substrate and each of the PPUs 300 and/or memories 304 may be packaged devices. In an embodiment, the CPU 530, switch 510, and the parallel processing module 525 are situated on a single semiconductor platform.

In an embodiment, the signaling rate of each NVLink 310 is 20 to 25 Gigabits/second and each PPU 300 includes six NVLink 310 interfaces (as shown in FIG. 5B, five NVLink 310 interfaces are included for each PPU 300). Each NVLink 310 provides a data transfer rate of 25 Gigabytes/second in each direction, with six links providing 300 Gigabytes/second. The NVLinks 310 can be used exclusively for PPU-to-PPU communication as shown in FIG. 5B, or some combination of PPU-to-PPU and PPU-to-CPU, when the CPU 530 also includes one or more NVLink 310 interfaces.

In an embodiment, the NVLink 310 allows direct load/store/atomic access from the CPU 530 to each PPU's 300 memory 304. In an embodiment, the NVLink 310 supports coherency operations, allowing data read from the memories 304 to be stored in the cache hierarchy of the CPU 530, reducing cache access latency for the CPU 530. In an embodiment, the NVLink 310 includes support for Address Translation Services (ATS), allowing the PPU 300 to directly access page tables within the CPU 530. One or more of the NVLinks 310 may also be configured to operate in a low-power mode.

Figure 5C:
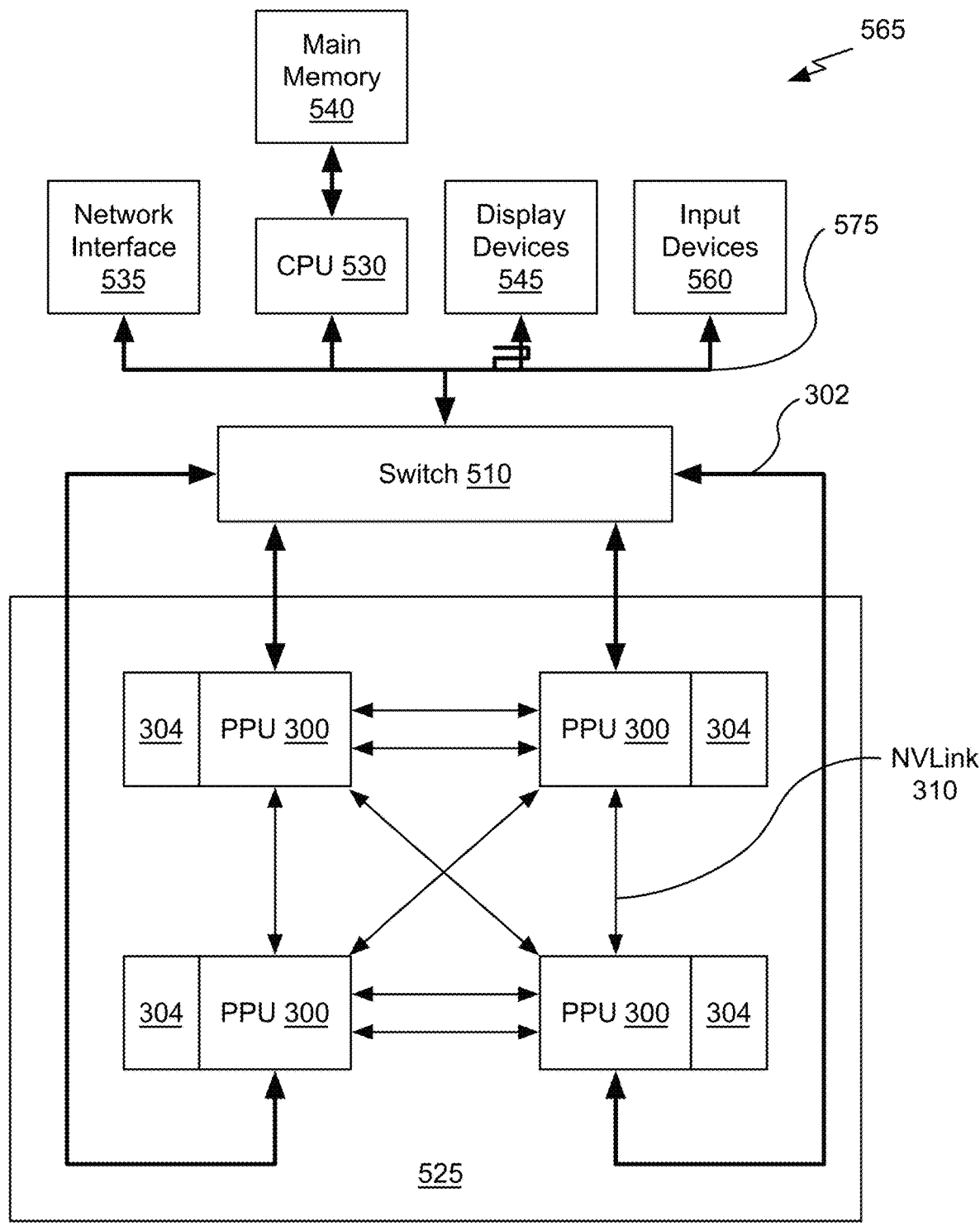
FIG. 5C illustrates an exemplary system in which the various architecture and/or functionality of the various previous embodiments may be implemented.

FIG. 5C illustrates an exemplary system 565 in which the various architecture and/or functionality of the various previous embodiments may be implemented. The exemplary system 565 may be configured to implement the method 130 shown in FIG. 1C and/or the method 250 shown in FIG. 2C.

As shown, a system 565 is provided including at least one central processing unit 530 that is connected to a communication bus 575. The communication bus 575 may be implemented using any suitable protocol, such as PCI (Peripheral Component Interconnect), PCI-Express, AGP (Accelerated Graphics Port), HyperTransport, or any other bus or point-to-point communication protocol(s). The system 565 also includes a main memory 540. Control logic (software) and data are stored in the main memory 540 which may take the form of random access memory (RAM).

The system 565 also includes input devices 560, the parallel processing system 525, and display devices 545, i.e. a conventional CRT (cathode ray tube), LCD (liquid crystal display), LED (light emitting diode), plasma display or the like. User input may be received from the input devices 560, e.g., keyboard, mouse, touchpad, microphone, and the like. Each of the foregoing modules and/or devices may even be situated on a single semiconductor platform to form the system 565. Alternately, the various modules may also be situated separately or in various combinations of semiconductor platforms per the desires of the user.

Further, the system 565 may be coupled to a network (e.g., a telecommunications network, local area network (LAN), wireless network, wide area network (WAN) such as the Internet, peer-to-peer network, cable network, or the like) through a network interface 535 for communication purposes.

The system 565 may also include a secondary storage (not shown). The secondary storage 610 includes, for example, a hard disk drive and/or a removable storage drive, representing a floppy disk drive, a magnetic tape drive, a compact disk drive, digital versatile disk (DVD) drive, recording device, universal serial bus (USB) flash memory. The removable storage drive reads from and/or writes to a removable storage unit in a well-known manner.

Computer programs, or computer control logic algorithms, may be stored in the main memory 540 and/or the secondary storage. Such computer programs, when executed, enable the system 565 to perform various functions. The memory 540, the storage, and/or any other storage are possible examples of computer-readable media.

The architecture and/or functionality of the various previous figures may be implemented in the context of a general computer system, a circuit board system, a game console system dedicated for entertainment purposes, an application-specific system, and/or any other desired system. For example, the system 565 may take the form of a desktop computer, a laptop computer, a tablet computer, servers, supercomputers, a smart-phone (e.g., a wireless, hand-held device), personal digital assistant (PDA), a digital camera, a vehicle, a head mounted display, a hand-held electronic device, a mobile phone device, a television, workstation, game consoles, embedded system, and/or any other type of logic.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

Machine Learning

Deep neural networks (DNNs) developed on processors, such as the PPU 300 have been used for diverse use cases, from self-driving cars to faster drug development, from automatic image captioning in online image databases to smart real-time language translation in video chat applications. Deep learning is a technique that models the neural learning process of the human brain, continually learning, continually getting smarter, and delivering more accurate results more quickly over time. A child is initially taught by an adult to correctly identify and classify various shapes, eventually being able to identify shapes without any coaching. Similarly, a deep learning or neural learning system needs to be trained in object recognition and classification for it to get smarter and more efficient at identifying basic objects, occluded objects, etc., while also assigning context to objects.

At the simplest level, neurons in the human brain look at various inputs that are received, importance levels are assigned to each of these inputs, and output is passed on to other neurons to act upon. An artificial neuron or perceptron is the most basic model of a neural network. In one example, a perceptron may receive one or more inputs that represent various features of an object that the perceptron is being trained to recognize and classify, and each of these features is assigned a certain weight based on the importance of that feature in defining the shape of an object.

A deep neural network (DNN) model includes multiple layers of many connected nodes (e.g., perceptrons, Boltzmann machines, radial basis functions, convolutional layers, etc.) that can be trained with enormous amounts of input data to quickly solve complex problems with high accuracy. In one example, a first layer of the DNN model breaks down an input image of an automobile into various sections and looks for basic patterns such as lines and angles. The second layer assembles the lines to look for higher level patterns such as wheels, windshields, and mirrors. The next layer identifies the type of vehicle, and the final few layers generate a label for the input image, identifying the model of a specific automobile brand.

Once the DNN is trained, the DNN can be deployed and used to identify and classify objects or patterns in a process known as inference. Examples of inference (the process through which a DNN extracts useful information from a given input) include identifying handwritten numbers on checks deposited into ATM machines, identifying images of friends in photos, delivering movie recommendations to over fifty million users, identifying and classifying different types of automobiles, pedestrians, and road hazards in driverless cars, or translating human speech in real-time.

During training, data flows through the DNN in a forward propagation phase until a prediction is produced that indicates a label corresponding to the input. If the neural network does not correctly label the input, then errors between the correct label and the predicted label are analyzed, and the weights are adjusted for each feature during a backward propagation phase until the DNN correctly labels the input and other inputs in a training dataset. Training complex neural networks requires massive amounts of parallel computing performance, including floating-point multiplications and additions that are supported by the PPU 300. Inferencing is less compute-intensive than training, being a latency-sensitive process where a trained neural network is applied to new inputs it has not seen before to classify images, translate speech, and generally infer new information.

Neural networks rely heavily on matrix math operations, and complex multi-layered networks require tremendous amounts of floating-point performance and bandwidth for both efficiency and speed. With thousands of processing cores, optimized for matrix math operations, and delivering tens to hundreds of TFLOPS of performance, the PPU 300 is a computing platform capable of delivering performance required for deep neural network-based artificial intelligence and machine learning applications.

What is claimed is:

1. A computer-implemented method, comprising:
    training, for a first portion of a training process, a generative adversarial network (GAN) comprising a single generator neural network coupled to a discriminator neural network, wherein a topology of the GAN comprises layers within the single generator neural network and within the discriminator neural network;
    modifying the topology of the GAN to produce a modified GAN, wherein at least one layer is inserted into each of the single generator neural network and the discriminator neural network; and
    training the modified GAN for a second portion of the training process.

2. The computer-implemented method of claim 1, wherein modifying the topology increases spatial resolution of an output of the single generator neural network.

3. The computer-implemented method of claim 1, wherein the at least one layer that is inserted into the single generator neural network is higher resolution compared with the layers.

4. The computer-implemented method of claim 1, wherein the at least one layer that is inserted into the discriminator neural network is higher resolution compared with the layers.

5. The computer-implemented method of claim 1, wherein the topology is modified by removing at least one layer in the single generator neural network.

6. The computer-implemented method of claim 1, wherein training data includes example output data, and, further comprising, during the training of the modified GAN:
    processing input data by the single generator neural network to produce output data;
    modifying the example output data to produce modified training data; and
    processing the modified training data and the output data by the discriminator neural network to produce updated parameters for the GAN.

7. The computer-implemented method of claim 6, wherein the training data that is used for the first portion is different compared with the modified training data.

8. The computer-implemented method of claim 6, wherein modifying the training data comprises increasing or decreasing a resolution of the example output data.

9. The computer-implemented method of claim 6, wherein the training data is image data and modifying the training data comprises increasing a pixel resolution of the example output data.

10. The computer-implemented method of claim 6, further comprising:
    modifying the topology of the modified GAN to produce a second modified GAN; and training the second modified GAN for a third portion of the training process, wherein a resolution of the example output data is decreased to a first resolution and the modified example output data is lower resolution compared with the first resolution.

11. The computer-implemented method of claim 1, further comprising, during the second portion, smoothly modifying the topology.

12. The computer-implemented method of claim 1, wherein, during the second portion, first data input to the at least one layer that is inserted into the single generator neural network are interpolated with second data generated by the at least one layer that is inserted into the single generator neural network to produce output data of the single generator neural network.

13. The computer-implemented method of claim 12, wherein a weight increases to smoothly transition the output data from the first data to the second data.

14. The computer-implemented method of claim 1, wherein the GAN processes three-dimensional image data.

15. The computer-implemented method of claim 1, wherein the GAN processes audio data.

16. The computer-implemented method of claim 1, wherein, during the second portion, first data input to the at least one layer that is inserted into the discriminator neural network are interpolated with second data generated by the at least one layer that is inserted into the discriminator neural network.

17. A system, comprising:
  a generative adversarial network (GAN) comprising a single generator neural network coupled to a discriminator neural network, wherein
    the GAN is trained for a first portion of a training process and a topology of the GAN comprises first layers within the single generator neural network and second layers within the discriminator neural network;
    the topology of the GAN is modified to produce a modified GAN, wherein at least one layer is inserted into each of the single generator neural network and the discriminator neural network; and
    the modified GAN is trained for a second portion of the training process.

18. The system of claim 17, wherein modifying the topology increases spatial resolution of an output of the single generator neural network.

19. The system of claim 17, wherein the at least one layer that is inserted into the single generator neural network is higher resolution compared with the first layers.

20. A non-transitory computer-readable media storing computer instructions for training a generative adversarial network (GAN) comprising a single generator neural network coupled to a discriminator neural network that, when executed by one or more processors, cause the one or more processors to perform the steps of:
  training the GAN for a first portion of a training process, wherein a topology of the GAN comprises layers within the single generator neural network and within the discriminator neural network;
  modifying the topology of the GAN to produce a modified GAN, wherein at least one layer is inserted into each of the single generator neural network and the discriminator neural network; and
  training the modified GAN for a second portion of the training process.

* * * * *